US00RE48578E

(19) United States
(12) Reissued Patent
Bier et al.

(10) Patent Number: US RE48,578 E
(45) **Date of Reissued Patent: *Jun. 1, 2021**

(54) ENCLOSURE FOR SUBMERSIBLE NETWORK PROTECTORS

(71) Applicant: Richards Manufacturing Company, a New Jersey Limited Partnership, Irvington, NJ (US)

(72) Inventors: Bruce Bier, Warren, NJ (US); Mantas Jarasunas, Parlin, NJ (US); Joseph Bier, Warren, NJ (US)

(73) Assignee: Richards Manufacturing Company, a New Jersey Limited Partnership, Irvington, NJ (US)

( * ) Notice: This patent is subject to a terminal disclaimer.

(21) Appl. No.: 16/167,142

(22) Filed: Oct. 22, 2018

Related U.S. Patent Documents

Reissue of:
(64) Patent No.: 9,379,526
Issued: Jun. 28, 2016
Appl. No.: 14/667,050
Filed: Mar. 24, 2015

U.S. Applications:
(63) Continuation of application No. 15/626,682, filed on Jun. 19, 2017, now Pat. No. Re. 47,096, which is an application for the reissue of Pat. No. 9,379,526.

(60) Provisional application No. 61/972,635, filed on Mar. 31, 2014.

(51) Int. Cl.

| | |
|---|---|
| ***H02B 1/28*** | (2006.01) |
| ***H02B 1/38*** | (2006.01) |
| ***H02B 1/56*** | (2006.01) |
| ***H02B 1/32*** | (2006.01) |
| ***H02B 7/08*** | (2006.01) |

(52) U.S. Cl.
CPC ..... *H02B 1/28* (2013.01); *H02B 1/38* (2013.01); *H02B 1/32* (2013.01); *H02B 1/565* (2013.01); *H02B 7/08* (2013.01)

(58) Field of Classification Search
CPC . H02B 1/28; H02B 1/38; H02B 1/565; H02G 9/00; H02G 9/10
USPC ..... 174/50; 49/368, 369; 361/608
See application file for complete search history.

(56) References Cited

U.S. PATENT DOCUMENTS

| | | | |
|---|---|---|---|
| RE24,478 | E | 12/1956 | Kilbourne |
| 2,774,621 | A | 12/1956 | Kilbourne |
| 3,054,975 | A | 9/1962 | Barr |

(Continued)

*Primary Examiner* — Tuan H Nguyen
(74) *Attorney, Agent, or Firm* — Stroock & Stroock & Lavan LLP

(57) ABSTRACT

An enclosure for a network protector in an electrical distribution network includes a cabinet body that defines an interior region that accepts the network protector. The cabinet body three electrodes sealed with and electrically isolated from the cabinet body and each other, which extend through the cabinet body to establish electrical connection between corresponding terminals of the network protector and the electrical distribution network. First and second doors are pivotably connected to opposing sides of the cabinet body and have respective contact surfaces to seal against the cabinet body. A first gasket is disposed along a distal edge surface of the first door, and a second gasket is disposed along a distal edge surface of the second door. At least a portion of the first gasket and the second gasket have conformal shapes that sealingly mate with each other when the first and second doors are in a closed position.

8 Claims, 32 Drawing Sheets

(56) References Cited

U.S. PATENT DOCUMENTS

| | | | | |
|---|---|---|---|---|
| 4,944,876 | A | 7/1990 | Miller | |
| 5,216,840 | A * | 6/1993 | Andrews | E05B 65/001 114/117 |
| 5,465,528 | A | 11/1995 | Schinzel et al. | |
| 6,979,775 | B2 * | 12/2005 | Ritter | H05K 5/0208 174/40 R |
| 7,978,463 | B1 * | 7/2011 | Haun | E04H 5/02 312/223.2 |
| 8,083,320 | B2 | 12/2011 | Yoshida et al. | |
| 9,255,712 | B2 | 2/2016 | Yantis et al. | |
| 10,004,155 | B1 * | 6/2018 | Bier | H05K 5/061 |
| RE47,096 | E * | 10/2018 | Bier | H02B 1/38 |
| 2018/0295738 | A1 * | 10/2018 | Bier | H02B 1/28 |

* cited by examiner

ENCLOSURE FOR SUBMERSIBLE NETWORK PROTECTORS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a continuation reissue of U.S. application Ser. No. 15/626,682, which is an application for reissue of U.S. Pat. No. 9,379,526, now U.S. Pat. No. Re 47,096, which* claims the benefit of U.S. Provisional Application No. 61/972,635, filed Mar. 31, 2014, the contents of which are incorporated herein by reference.

BACKGROUND OF THE INVENTION

1. Field of the Invention

The present invention generally relates to electrical distribution systems. In particular, the present invention relates to an enclosure for a network protector in an electrical distribution system.

2. Description of the Related Art

With reference to FIG. 1, a network protector 14 is a heavy duty switch designed to open and close under specific conditions within an electrical distribution system. These conditions are defined by industry standards. The operating voltage for a network protector is generally up to 600 Volts and is connected to the secondary (low voltage) side of a distribution transformer. The overwhelming majority of network protectors are installed in underground (sub-surface) structures 10. FIG. 1 illustrates dimensions (in feet and inches) of a typical underground structure 10. In most cases, the network protectors 14 are installed in sealed metal enclosures 12 designed to be submerged. As such, these enclosures 12 are referred to as "submersible network protector housings."

As shown in FIG. 1, in certain cases, there are underground structures 10 that are too small or confined to allow for safe installation and operation of submersible network protector housings 12, which are normally larger than non-submersible enclosures. In these cases, non-submersible enclosures have been used. Typically, the underground structures 10 that house the non-submersible network protector enclosures are equipped with sump pumps to prevent flooding.

However, the sump pumps are subject to malfunction due to a number of reasons. During extreme flooding conditions, particularly tidal flooding conditions, much equipment is subject to destruction. This occurred during Hurricane Sandy in New York City, for example.

A need for improved submersible network protector enclosures thus exists.

SUMMARY OF THE INVENTION

Preferred embodiments are directed to an enclosure for use within an electrical distribution system. The enclosure is designed to contain a component of the electrical distribution system, preferably a network protector, and to withstand ingress of water into the enclosure, preferably up to depths of 25 feet.

The enclosure includes a cabinet body that defines an interior region that accepts the component (e.g., network protector). The cabinet body has one or more electrodes sealed with and electrically isolated from the cabinet body, which extend through the cabinet body to establish electrical connection between a corresponding terminal of the component and an electrical distribution network. A first door is pivotably connected to a side of the cabinet body, and the first door includes a contact surface configured to sealingly contact a corresponding surface on the cabinet body. A second door is pivotably connected to an opposing side of the cabinet body, and the second door also includes a contact surface configured to sealingly contact a corresponding surface on the cabinet body. A first gasket is disposed along a distal edge surface of the first door, and a second gasket is disposed along a distal edge surface of the second door. At least a portion of the first gasket and the second gasket have conformal shapes that sealingly mate with each other when the first and second doors are in a closed position.

In certain embodiments, the first gasket includes a recess that extends along the longitudinal length of the first gasket and the second gasket includes a corresponding protrusion that extends along the longitudinal length of the second gasket. The protrusion is shaped to correspondingly engage with the recess when the first and second doors are in the closed position.

In preferred embodiments, the first gasket and the second gasket are disposed within respective recesses that extend along the respective distal edge surfaces of the first door and the second door. Also, preferably, at least a third gasket is disposed between the contact surfaces of the first and second doors and the corresponding contact surfaces of the cabinet body.

Various embodiments include a locking mechanism to lock the first and second doors in the closed position. In some embodiments, the locking mechanism comprises a plurality of quick-release latching mechanisms disposed between the first door and the cabinet body and disposed between the second door and the cabinet body. One or more quick-release latching mechanisms can also be disposed between the first door and the second door.

In other embodiments, the locking mechanism comprises a handle disposed on the second door that is mechanically coupled to one or more clamps configured to engage corresponding surfaces fixed within the cabinet body when the handle is turned. The handle may also be coupled to a cam that is configured to engage a corresponding surface fixed to the first door when the handle is turned. In such embodiments, it is preferred that the first door includes a lip that is overlapped by the distal edge surface of the second door when in the closed position, and that the second door includes a gasket to sealingly engage with this lip when in the closed position. In certain variations, the contact surface of the first door can includes a recess that extends along the contact surface of the first door and that terminates at the lip, and a gasket is disposed within this recess and protrudes above the recess. This gasket includes an extension extending from the recess to seal a contact surface of the lip with respect to a corresponding surface on the cabinet body when in the closed position, and a top surface of the extension is concave so as to be conformal to a corresponding surface on the gasket of the second door. Furthermore, in such embodiments, it is preferred that the gasket of the second door extends around an entire perimeter of the second door. Such embodiments may also include quick-release latching mechanisms.

For various embodiments, an external surface of the cabinet body comprises a plurality of radiating fins. The internal surface of the cabinet body may also include a plurality of fins thermally coupled to the radiating fins.

In preferred embodiments, the cabinet body includes at least three electrodes sealed with and electrically isolated from both the cabinet body and each other and which extend through the cabinet body to establish electrical connections between corresponding terminals of a network protector set within the enclosure and the electrical distribution network.

BRIEF DESCRIPTION OF THE DRAWINGS

The various aspects and embodiments disclosed herein will be better understood when read in conjunction with the appended drawings, wherein like reference numerals refer to like components. For the purposes of illustrating aspects of the present application, there are shown in the drawings certain preferred embodiments. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The drawings are not necessarily drawn to scale and are not in any way intended to limit the scope of this invention, but are merely presented to clarify illustrated embodiments of the invention. In these drawings.

DETAILED DESCRIPTION OF THE PREFERRED EMBODIMENTS

Figure 1:
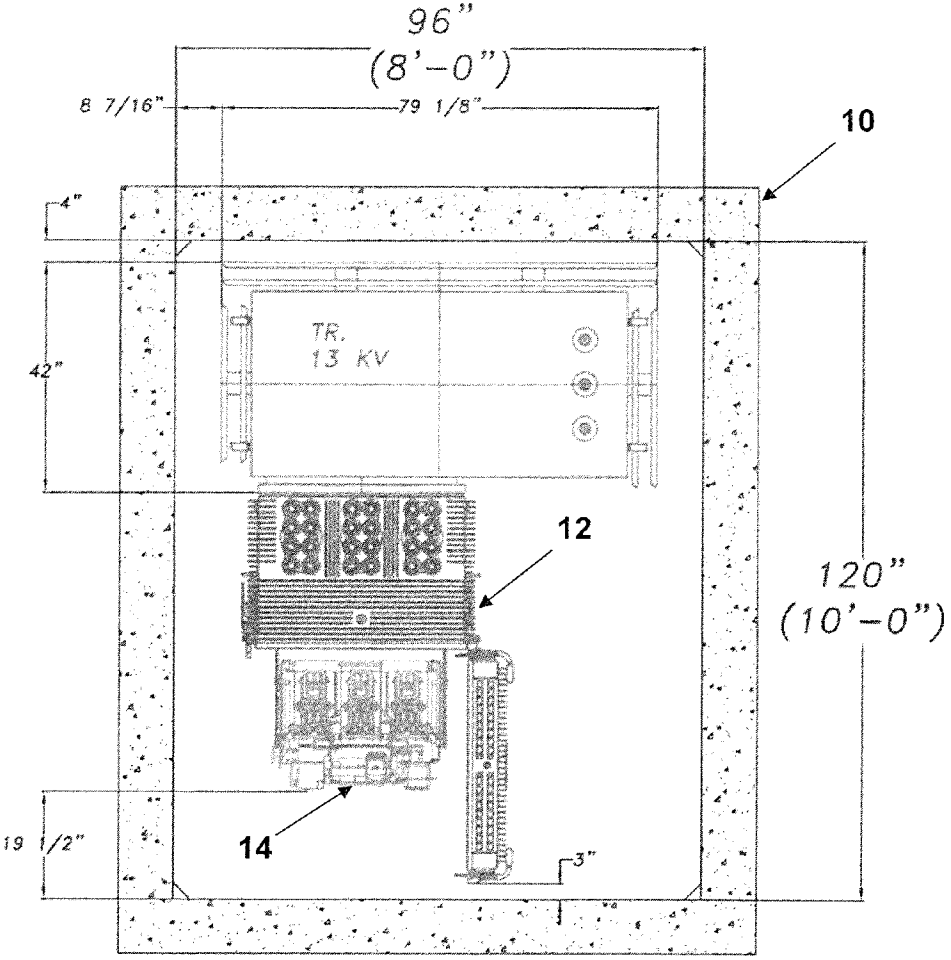
Fig. 1 Prior Art
FIG. 1 is top view of a prior art enclosure within an underground structure.
Figure 2:
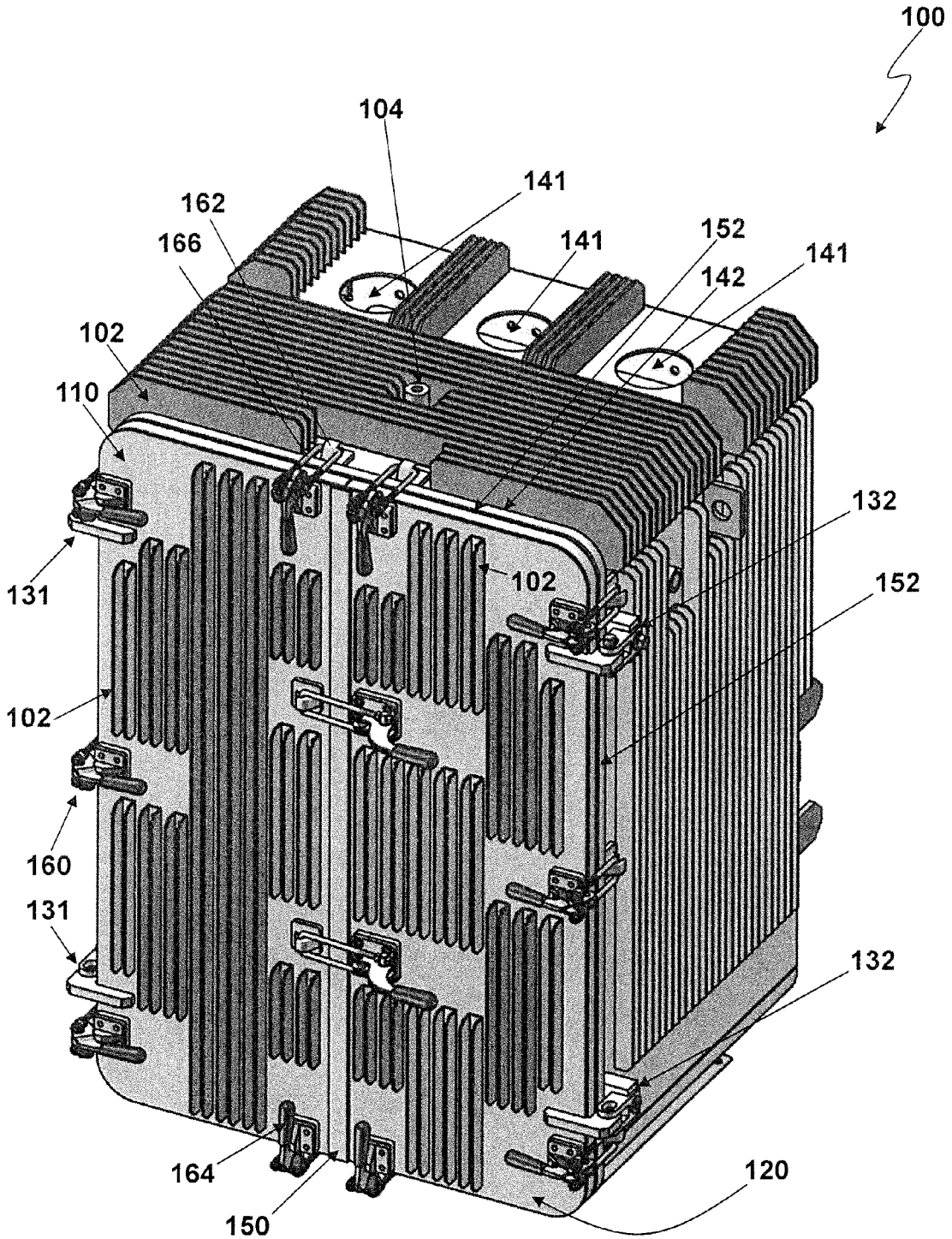
FIG. 2 is perspective view of a first embodiment enclosure.
Figure 3:
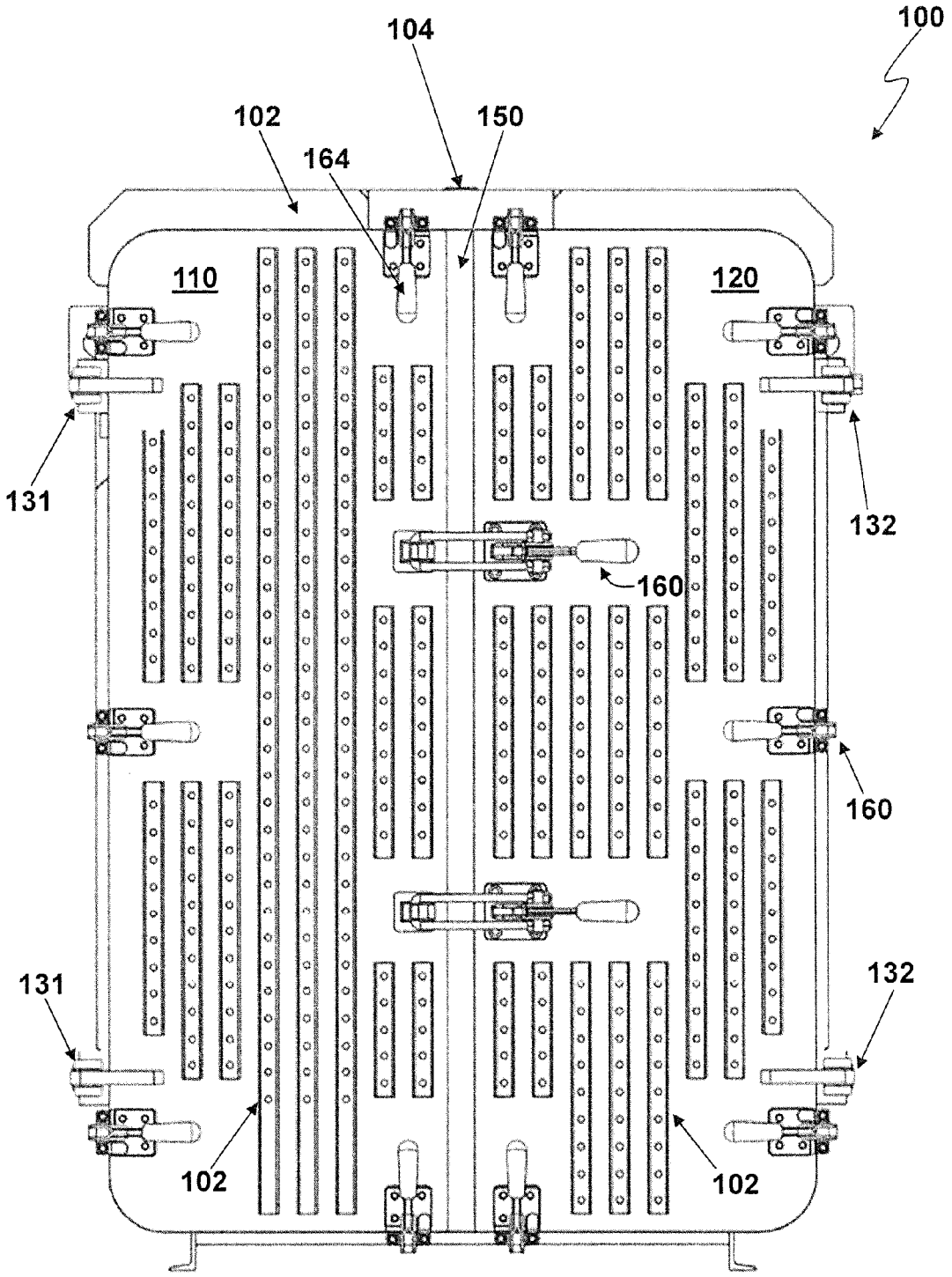
FIG. 3 is a front view of the enclosure shown in FIG. [1] *2*.
Figure 4:
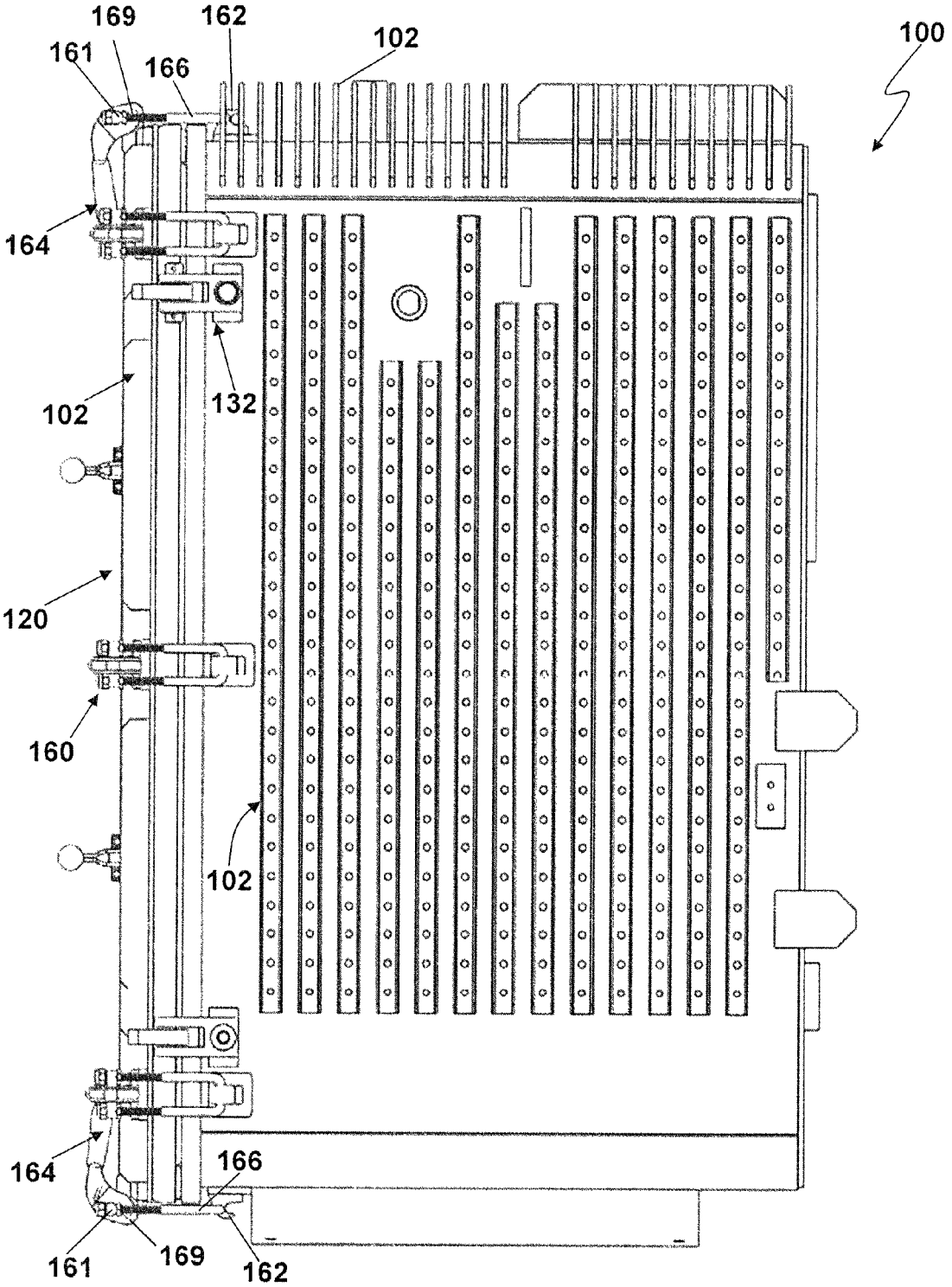
FIG. 4 is right-side view of the enclosure shown in FIG. [1] *2*.
Figure 5:
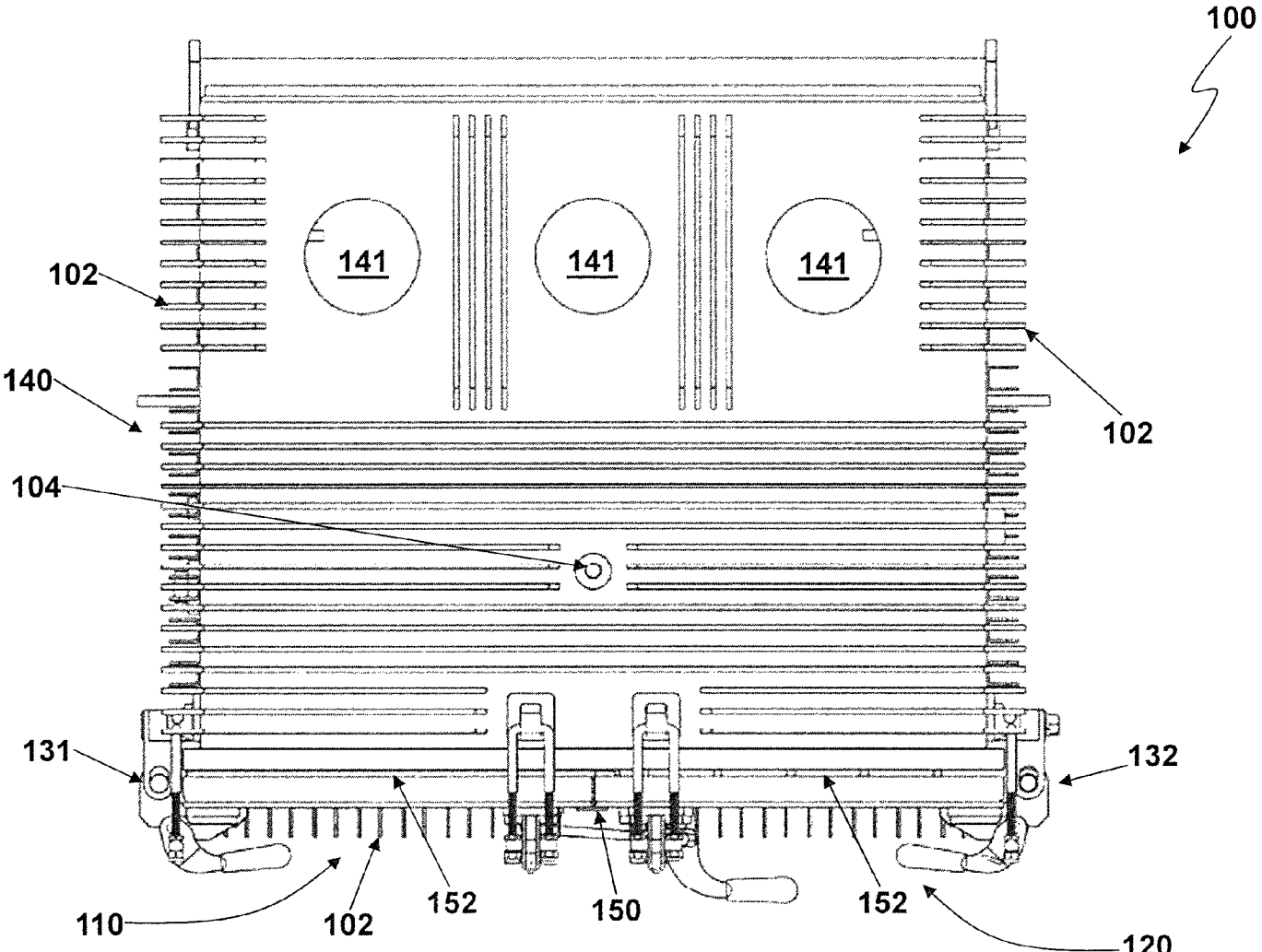
FIG. 5 is top view of the enclosure shown in FIG. [1] *2*.
Figure 6:
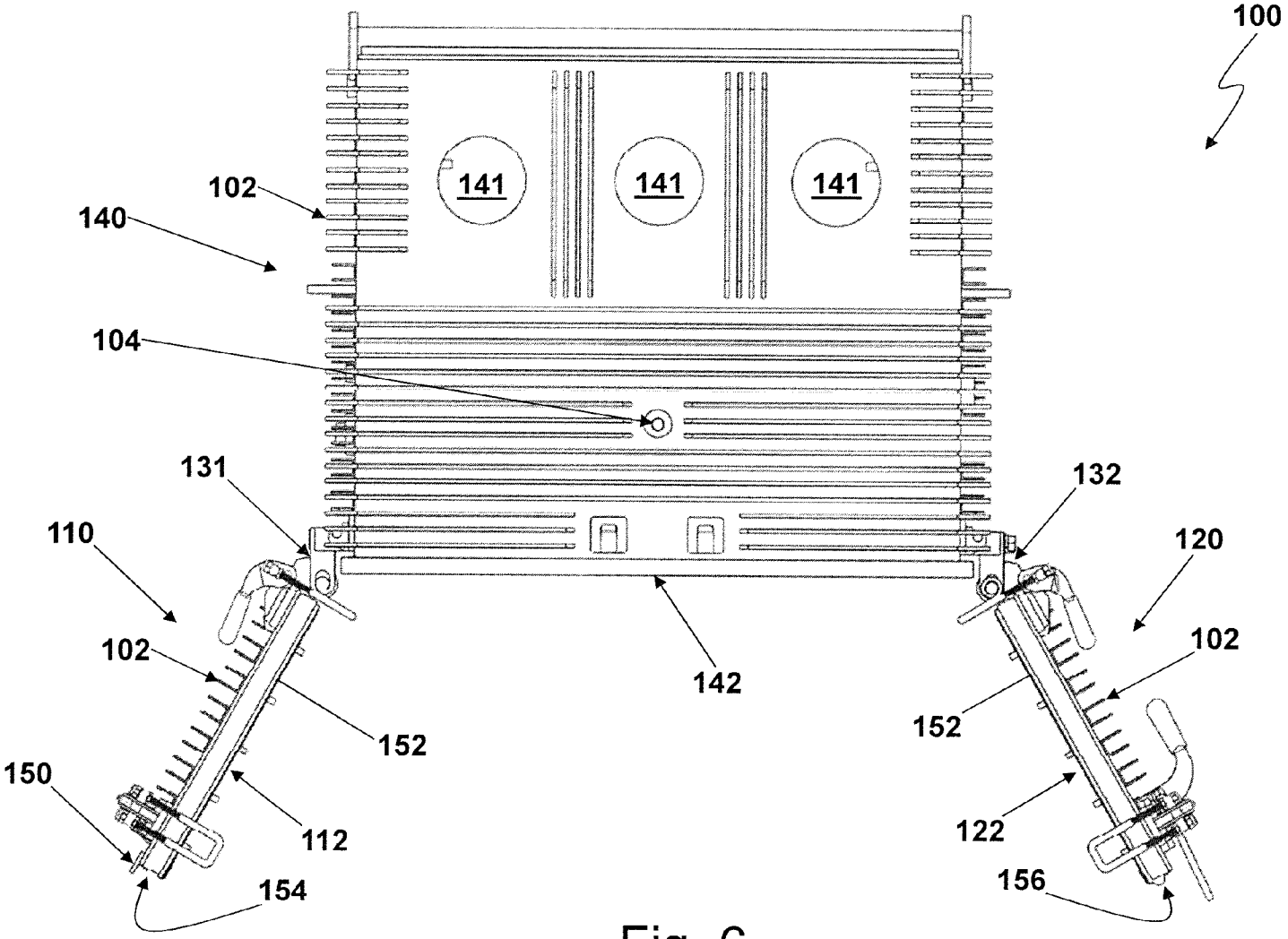
FIG. 6 is top view of the enclosure shown in FIG. [1] *2* with the access doors open.
Figure 7:
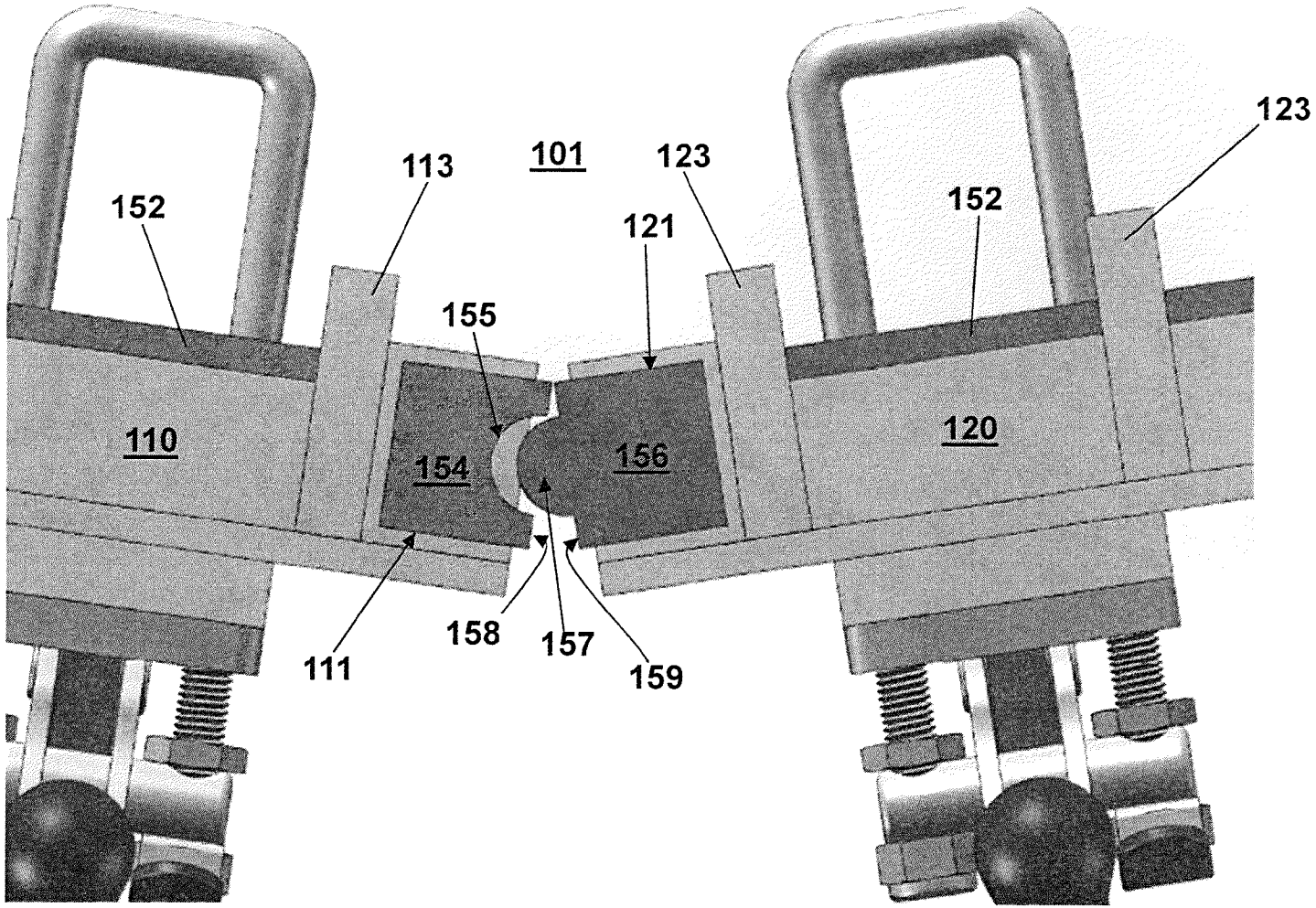
FIGS. 7 to 11 are detailed cross-sectional views illustrating closing of the split-access doors for the enclosure shown in FIG. [1] *2*.
Figure 8:
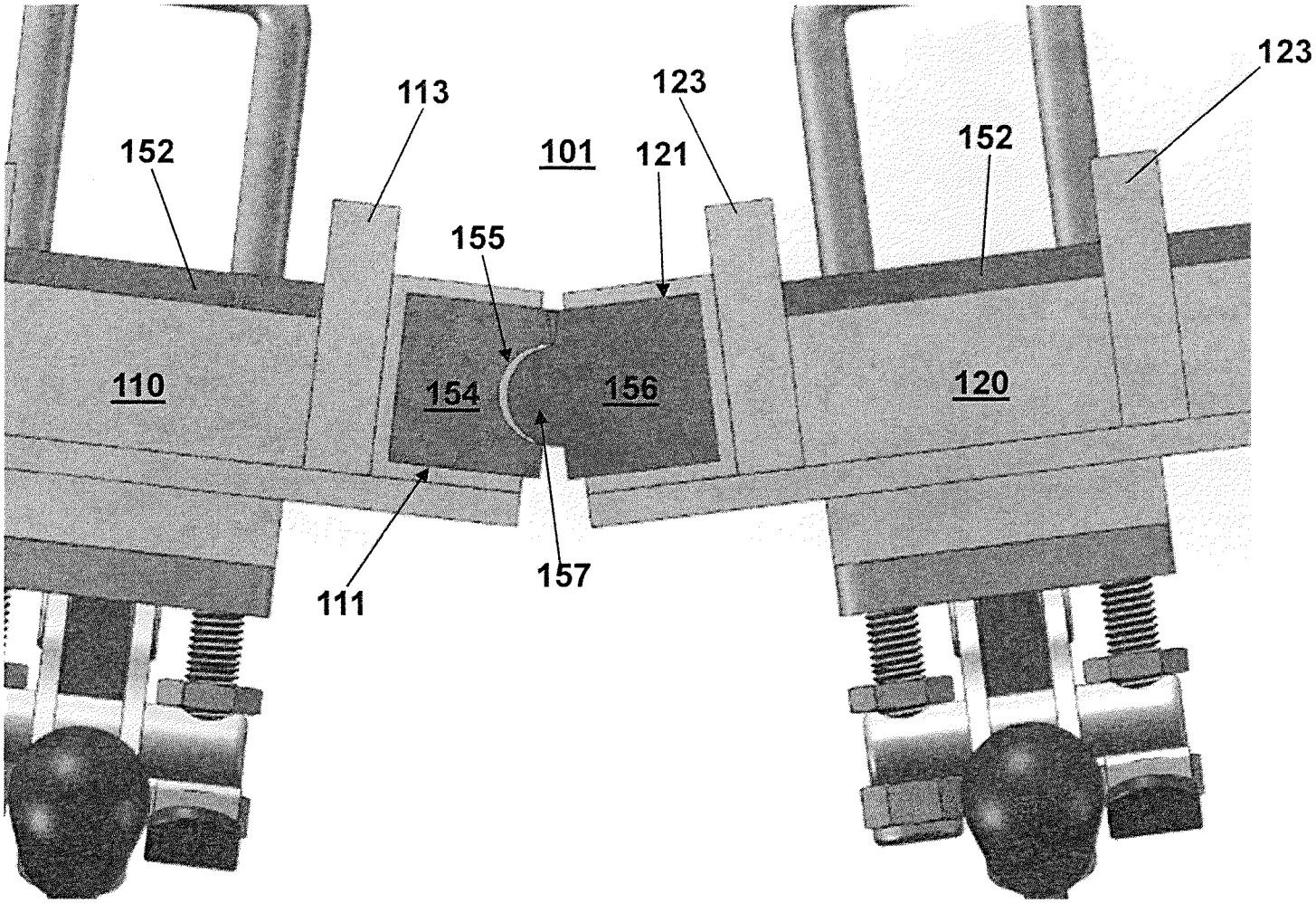
Figure 9:
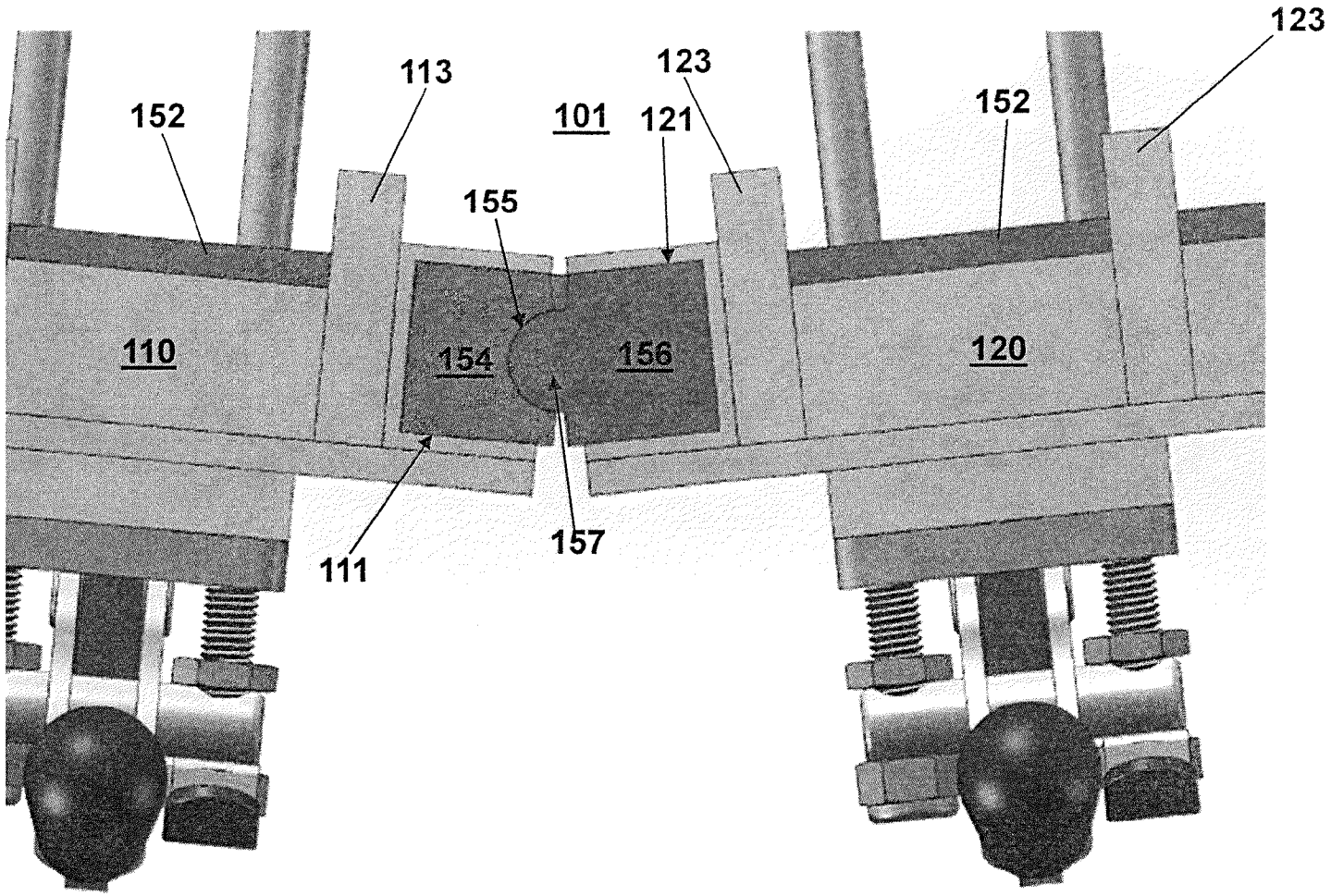
Figure 10:
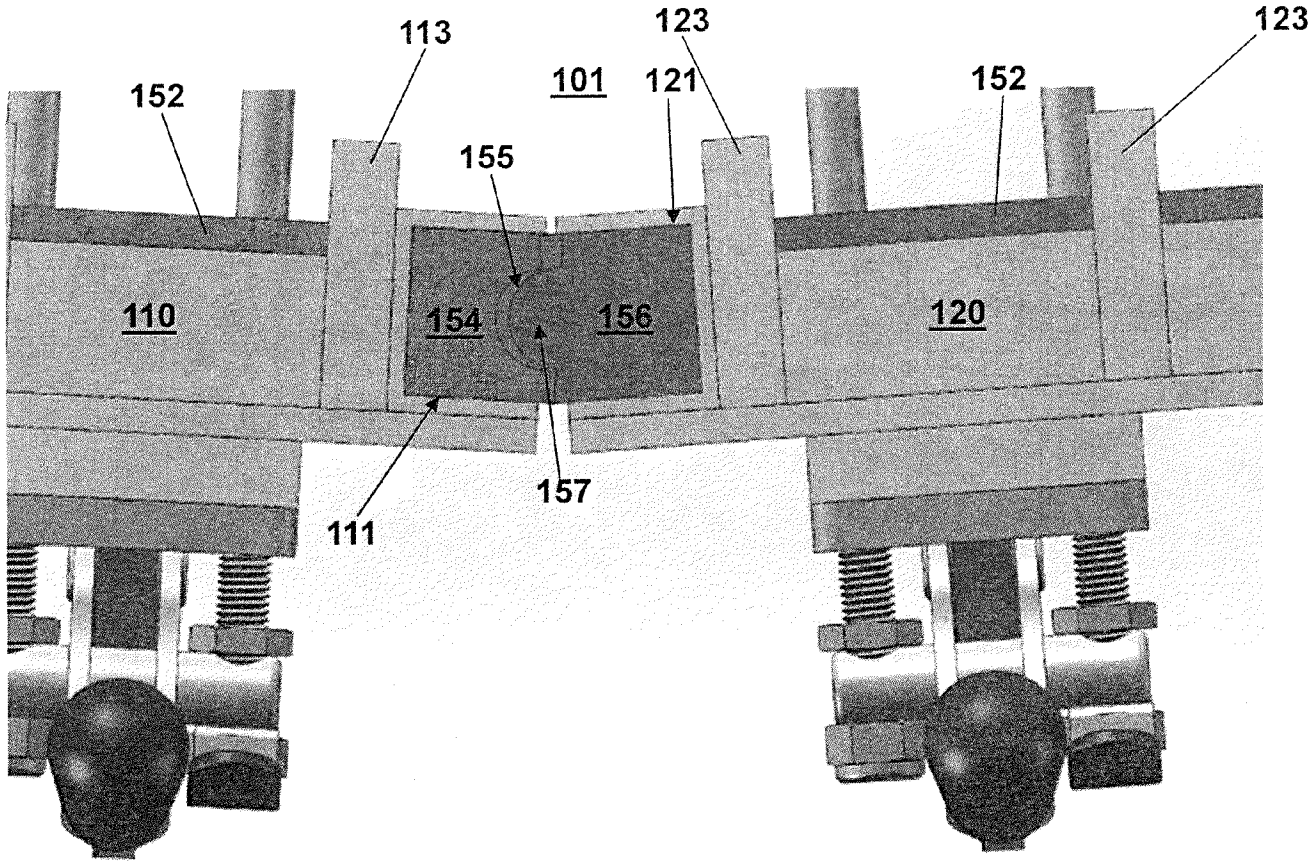
Figure 11:
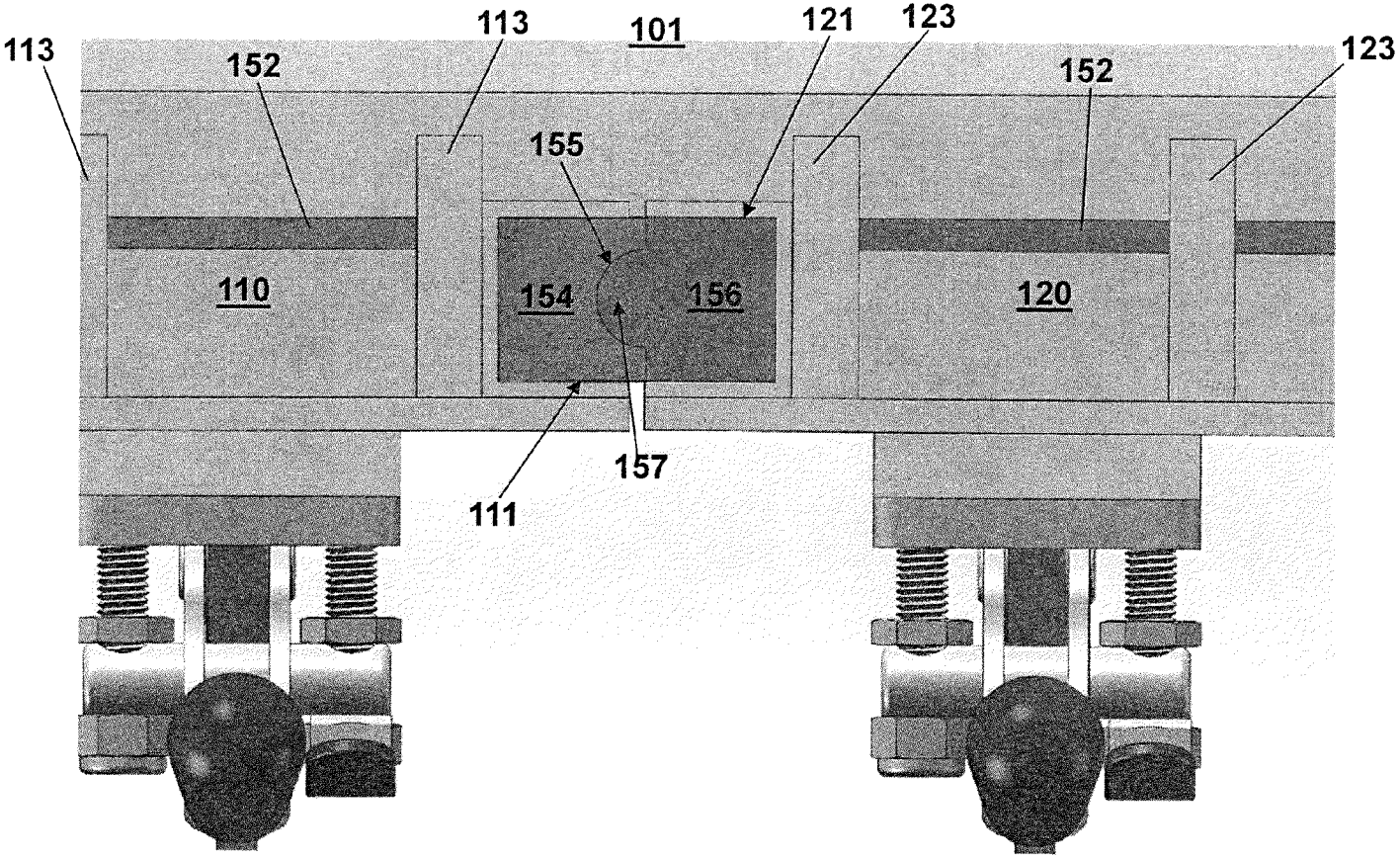

Various embodiments of the invention are intended to allow for the network protector to be submerged without damage yet still fit in an underground structure that normally only allows for a non-submersible enclosure.

A first embodiment submersible enclosure 100 is depicted in FIGS. [1-12] *2-12*. The enclosure 100 is made of metal, preferably steel, and is configured to withstand submersion in water to a depth of 25 feet (as measured from the bottom of enclosure 100) without water entering into the interior region 101 of enclosure 100. By way of example, enclosure 100 can be made from ¼ inch thick steel, and include a valve 104 used to pressurize the interior region 101, preferably with an inert gas, such as nitrogen, so as to further prevent the ingress of water. Interior 101 of enclosure 100 is sized to accept a network protector 199. Enclosure 100 includes a first door 110 and a second door 120, which are coupled by way of respective hinges 131, 132 on opposing sides of cabinet body 140. Cabinet body 140, with doors 110, 120, defines internal region 101 within which is disposed network protector 199. Cabinet body 140 is preferably grounded, and includes three electrode openings 141 on a top surface, which are used to respectively electrically connect to corresponding electrodes on network protector 199. Each electrode opening 141 accepts a terminal or bushing that is electrically isolated from cabinet body 140 and extends through cabinet body 140 to connect to the low voltage side of the electrical distribution network. Each terminal or bushing forms a seal within its respective opening 141 that prevents the ingress of water into interior 101. By way of example, the electrode or terminal may be electrically isolated from the cabinet body 140 by an insulating material, such as polyester, fiberglass, porcelain, epoxy, etc. The insulating material can be sealed against the cabinet body 140 using a flat or O-ring type gasket to prevent water ingress. Other [example includes] *examples include* an electrode or terminal that is partially encapsulated in a polymeric (e.g., rubber) material that electrically isolates the electrode and forms a seal against the cabinet body 140 to prevent water entry.

The exterior surfaces of cabinet body 140 and doors 110, 120 include radiating fins 102 to radiate heat that network protector 199 generates within internal region 101, which heat is radiated into an underground structure 198. The interior surface of cabinet body 140 may also include fins, which collect heat generated within interior 101 and conduct this heat to the radiating fins 102 on the exterior surface. Interior surface of doors 110, 120 may also include fins. The radiating fins 102 can be, for example, welded to, riveted to or integrally formed with cabinet body 140 and doors 110, 120.

Hinges 131, 132 respectively pivotably and electrically connect first door 110 and second door 120 to opposite sides of cabinet body 140. The front of cabinet body 140 has a jamb surface 142, and each door 110, 120 has a corresponding contact surface 112, 122 configured to sealingly engage jamb surface 142 when swung shut on hinge 131, 132 to provide a water-tight seal between the doors 110, 120 and the cabinet body 140. To facilitate such sealing engagement, one or more of the jamb surface 142 and contact surfaces 112, 122 include jamb gaskets 152. In the embodiment shown in FIGS. [1] *2*-12, for example, a single gasket 152 is disposed along each of the respective contact surfaces 112, 122 of the doors 110, 120. Jamb gaskets 152 overlay the entirety of contact surfaces 112, 122 of the doors 110, 120 to ensure a proper, water-tight seal between the doors 110, 120 and the cabinet body 140. It will be appreciated that although jamb gaskets 152 in FIGS. 7-11 appear to be discontinuous, this appearance is simply a result of the cross-section taken for FIGS. 7-11. In fact, for the embodiment shown in FIGS. [1] *2*-11, jamb gaskets 152 overlay the entirety of their respective contact surfaces 112, 122. As illustrated in FIG. 7-11, the interior of doors 110, 120 can include steel stiffeners 113, 123 to ensure that doors 110, 120 do not bow when interior 101 of submersible enclosure 100 is pressurized, and in the cross-sections depicted in FIGS. 7-11, these stiffeners 113, 123 only appear to interrupt jamb gaskets 152.

To facilitate a water-tight seal between the doors 110, 120 themselves, each door 110, 120 includes a respective door gasket 154, 156. The door gaskets 154, 156 run along the entirety of the distal edge surface of each door 110, 120—i.e., the surface of door 110, 120 that is most distal from hinge 131, 132 and that swings towards its corresponding surface on the other door 120, 110. The door gaskets 154, 156 are configured to matingly engage with each other and are set within, and extend from, corresponding recesses 111, 121 that extends down the distal edge surface of each door 110, 120. For example, door gasket 154 may include a depression 155 that runs the length of door gasket 154 and is conformal with a corresponding protrusion 157 running the length of door gasket 156 when doors 110, 120 swing shut, as illustrated in FIGS. 7-11. As also illustrated in FIGS. 7-11, door gaskets [154,156] *154, 156* may be compressible against each other to ensure a tight seal between the two. Flat contact surfaces 158, 159 on each door gasket 154, 156, which are respectively adjacent to depression 155 and protrusion 157, may contact and sealingly engage their counterpart contact surfaces 159, 158 on the other door gasket 156, 154. Additionally, a protective strip 150, preferably made of steel, may be disposed on the external surface of one of the doors [154, 156] *110, 120* along and extending over the distal edge surface of the door [154, 156] *110, 120* to overlay, and thus protect, the door gaskets 154, 156 when doors 110, 120 are shut.

One or more locking mechanisms 160 are provided on doors 110, 120 and cabinet body 140 to lock and clamp doors 110, 120 into the closed position, thereby providing a watertight sealing of interior 101. Locking mechanisms 160 may be provided to lock doors 110, 120 to each other, and to lock doors 110, 120 to cabinet body 140. The locking mechanisms 160 pull doors 110, 120 towards jamb surface 142, and also pull the distal edge surfaces of doors 110, 120 towards each other. Each locking mechanism is a quick-release latching mechanism including a hook 162 disposed on a first surface, such as the exterior surface of cabinet body 140, and a handle 164 pivotably connected to a second surface, such as a door 110, 120. A loop 166 is pivotably connected near pivot point 169 of handle 164 and engages with hook 162. The mechanical advantage provided by handle 164 acting as a lever pulling on loop 166 draws the first surface towards the second surface, such as door 110, 120 to jamb surface 142, or first door 110 to second door 120. When in the locked position, the changed position of handle 164 causes pivot point 161 of loop 166 to correspondingly change to a position with respect to pivot point 169 and end of handle 164 that causes tension on loop 166 to generate a torque on handle 164 that urges handle 164 into the locked position, or which aligns the pivot points 169, 161 with loop 166 so that handle 164 is at least not urged out of the locked position.

Figure 12:
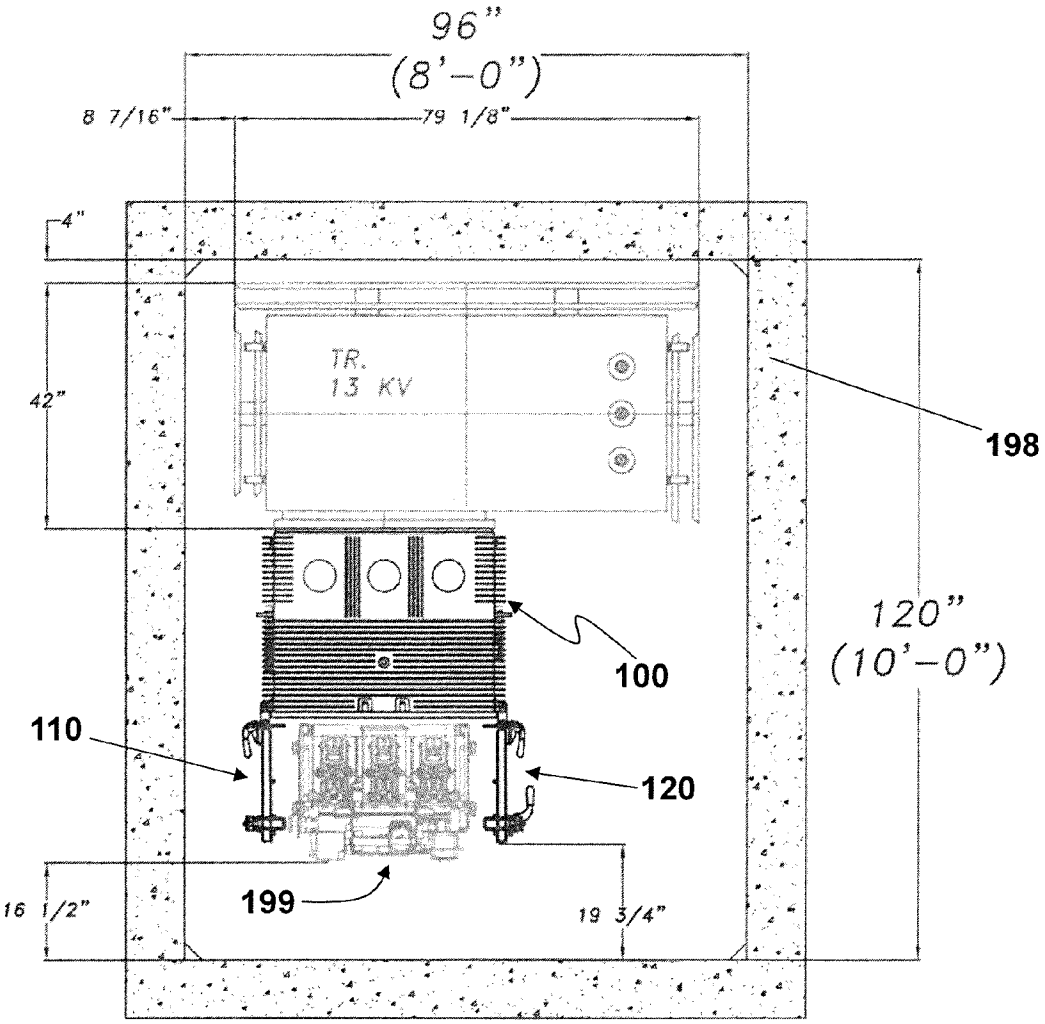
FIG. 12 is top view of the enclosure shown in FIG. [1] *2* within an underground enclosure.
Figure 13:
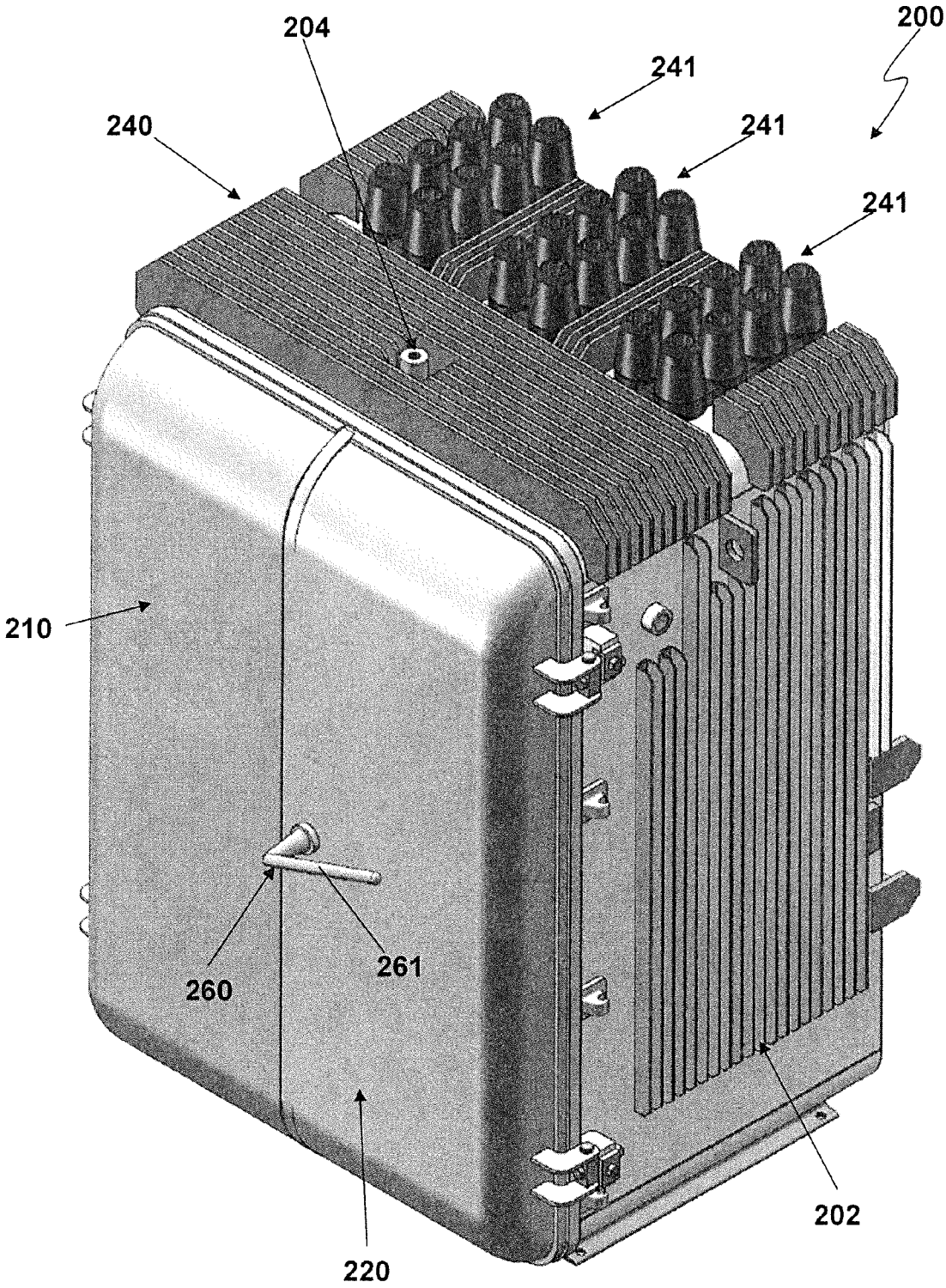
FIG. 13 is perspective view of a second embodiment enclosure.
Figure 14:
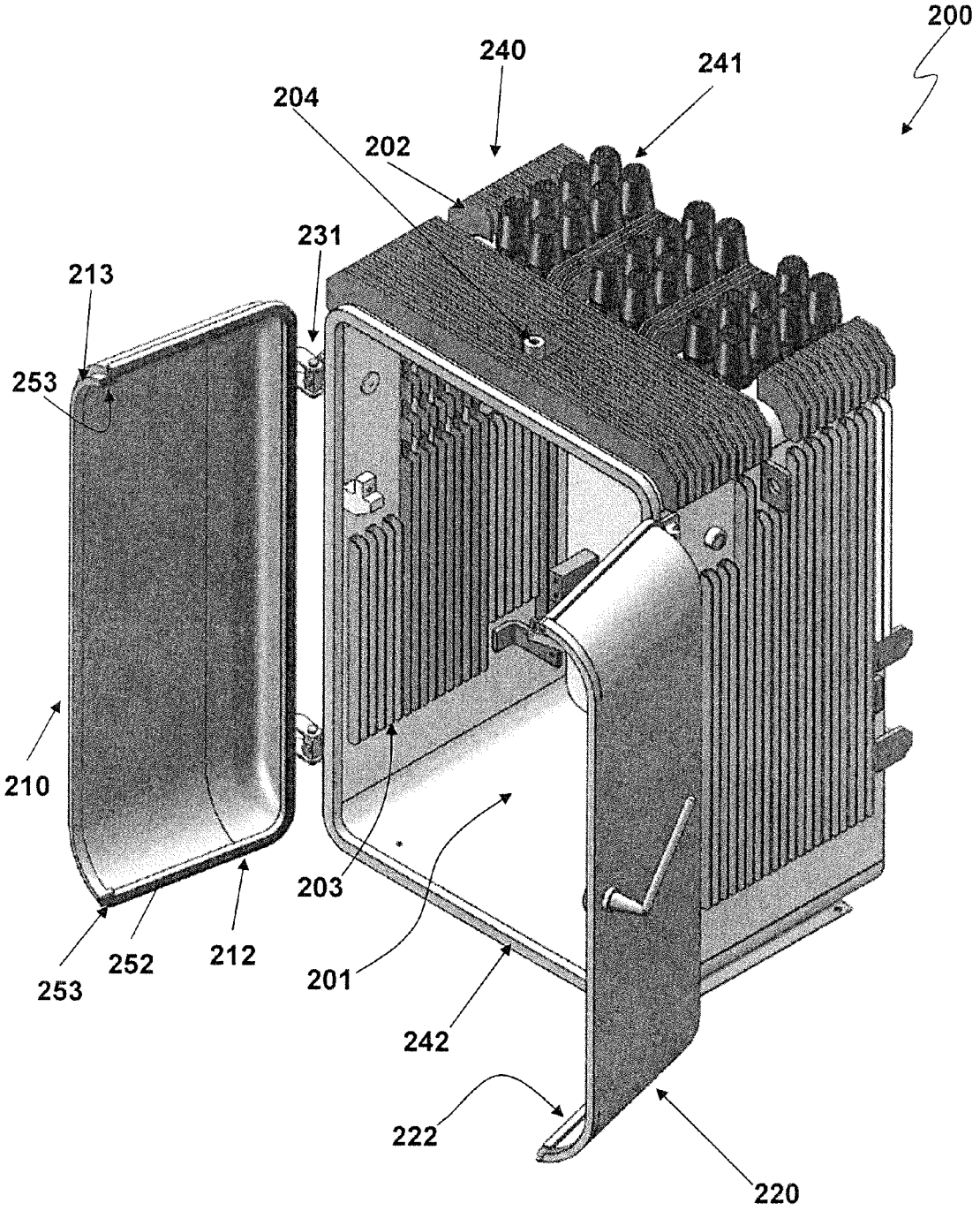
FIG. 14 is a perspective view of the enclosure shown in FIG. 13 with the access doors open.
Figure 15:
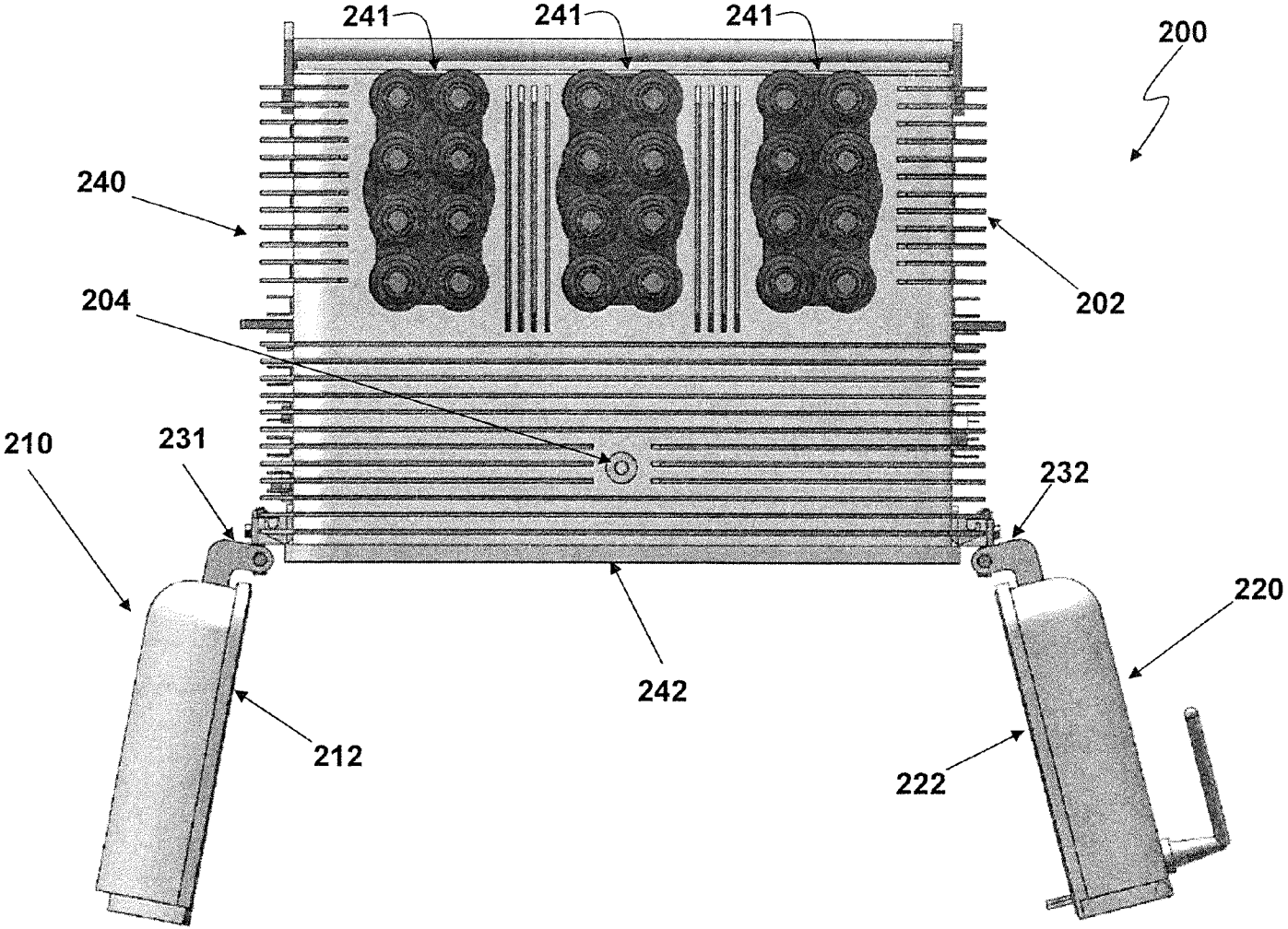
FIG. 15 is a top view of the enclosure shown in FIG. 13 with the access doors open.
Figure 16:
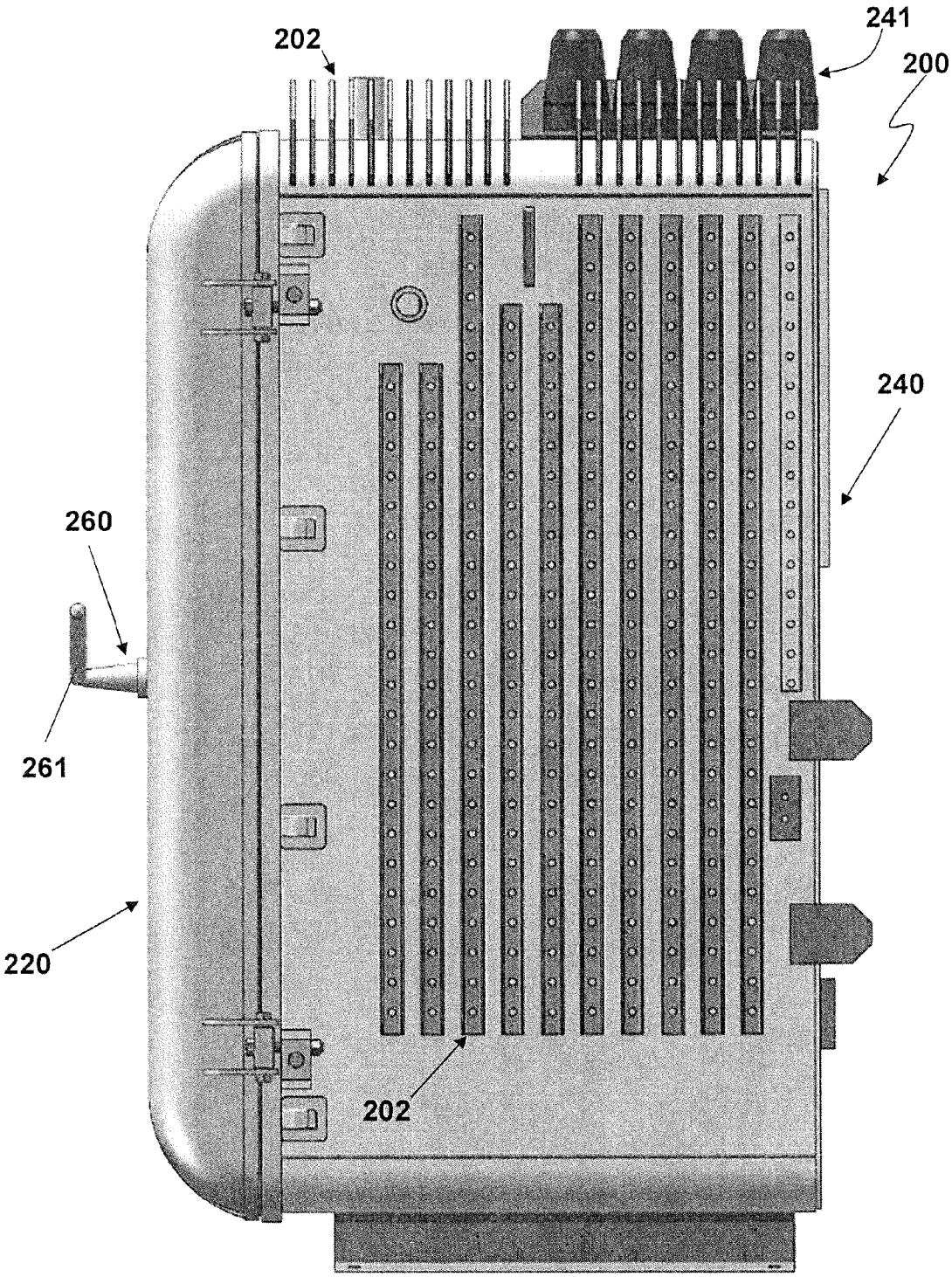
FIG. 16 is a right-side view of the enclosure shown in FIG. 13.

As illustrated in FIG. 12, in contrast to the single door enclosure 12 depicted in FIG. 1, the split-door arrangement of the embodiment enclosure 100 provides for significantly more space (over 19 inches versus three inches in the prior art) between doors 110, 120 and the wall of underground structure 198 when doors 110, 120 are opened. This additional space greatly facilitates access to interior region 101 of enclosure 100, and thus to network protector 199.

A second embodiment submersible enclosure 200 is depicted in FIGS. 13-27. Similar to enclosure 100, enclosure 200 is made of metal, preferably steel, and is configured to withstand submersion in water to a depth of 25 feet (as measured from the bottom of enclosure [100] *200*) without water entering into the interior region 201 of enclosure 200. Interior region 201 is sized to accept a network protector 299, and cabinet body 240 can include a pressure valve 204 to pressurize interior region 201. Enclosure 200 includes a first door 210 and a second door 220, which are coupled by way of respective hinges 231, 232 to opposing sides of cabinet body 240. Cabinet body 240, with doors 210, 220, defines internal region 201 within which network protector 299 is disposed. Cabinet body 240 is preferably electrically grounded, and includes three electrode sets 241 on a top surface. Each electrode set 241 electrically connects to a corresponding electrode or bushing on network protector 299, and thus extends through cabinet body 240. The electrodes/bushings in each electrode set 241 are electrically isolated from cabinet body 240 and are used to connect to the low voltage side of the electrical distribution network. Each electrode set 241 is sealed with cabinet body 240 to prevent the ingress of water into interior 101, such as by way of a flat gasket.

The exterior surface of cabinet body 240, and optionally doors 210, 220, includes radiating fins 202 to radiate heat that network protector 299 generates within internal region 201, which heat is radiated into an underground structure 298. The interior surface of cabinet body 240 may also include fins 203, and optionally doors 210, 220 as well, which collect heat generated within interior region 201 and conduct this heat to radiating fins 202 on the exterior surface of cabinet body 240. The radiating fins 202, 203 can be, for example, welded to, riveted to or integrally formed with cabinet body 240 and doors 210, 220.

Hinges 231, 232 respectively pivotably and electrically connect first door 210 and second door 220 to opposite side of cabinet body 240. The front of cabinet body 240 has a jamb surface 242, and each door 210, 220 has a corresponding contact surface 212, 222 configured to sealingly engage jamb surface 242 when swung shut on hinge 231, 232 to provide a water-tight seal between doors 210, 220 and cabinet body 240. To facilitate such sealing engagement, one or more of the jamb surface 242 and contact surfaces 212, 222 are provided with jamb gaskets. For example, such jamb gaskets can include a first jamb gasket 252 and a second jamb gasket 254 respectively disposed on the first door 210 and second door 220. Jamb gaskets 252, 254 overlay the entirety of respective contact surfaces 212, 222 of doors 210, 220, and partially overlap with each other, to ensure a proper, water-tight seal between doors 210, 220 and cabinet body 240.

To provide contact surfaces 212, 222, the distal edge surface of each door includes a recess 211, 221 that extends around the rim of door 210, 220 that forms contact surface 212, 222, and each jamb gasket 252, 254 is disposed within its respective recess 211, 221. Each jamb gasket 252, 254 extends partially from recess 211, 221 so as to make contact with jamb surface 242.

Figure 17:
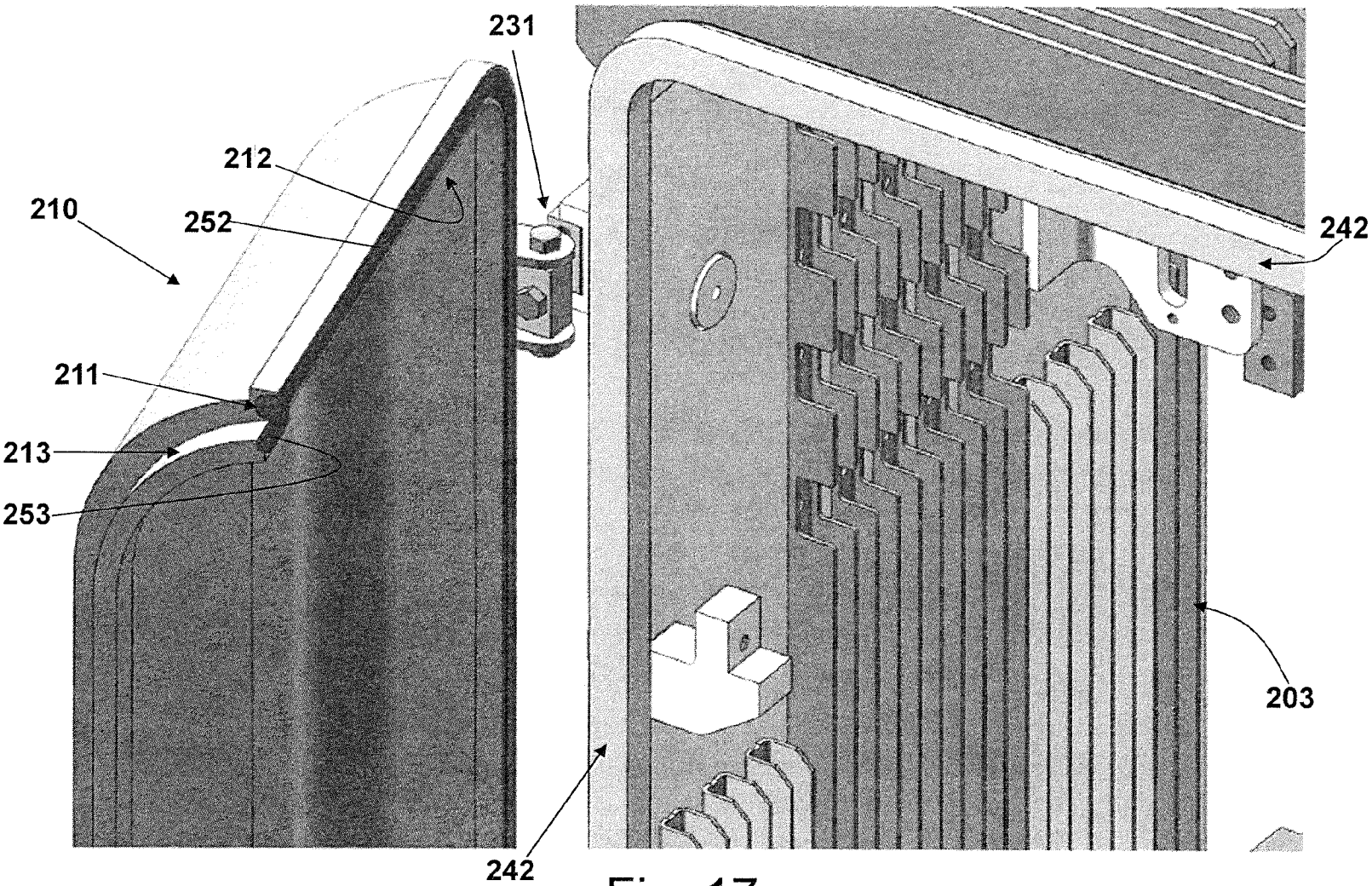
FIG. 17 is a detailed perspective view of a left door and gasket for the enclosure shown in FIG. 13.

As best illustrated in FIG. 17, distal edge surface of first door 210 is recessed with respect to the main outer surface of door 210, thereby providing a lip 213 that forms an L-shaped cross section and which, when in the closed position, is overlapped by a corresponding portion of the distal edge surface of second door 220. Recess 211 terminates at this lip 213, but first jamb gasket 252 continues, jogging downward with lip 213 to provide an extension 253 extending from recess 211, thus ensuring that contact surface 212 of lip [211] *213* is properly sealed. Lip 213 may include a notch to accommodate and provide backing for extension 253 of first jamb gasket 252. Extension 253 may co-terminate with contact surface 212 of lip 213 or may extend slightly beyond lip 213. Additionally, top surface of first jamb gasket extension 253 is concave so as to be conformal to the outer surface of the corresponding portion of second jamb gasket 254 on second door 220.

Figure 18:
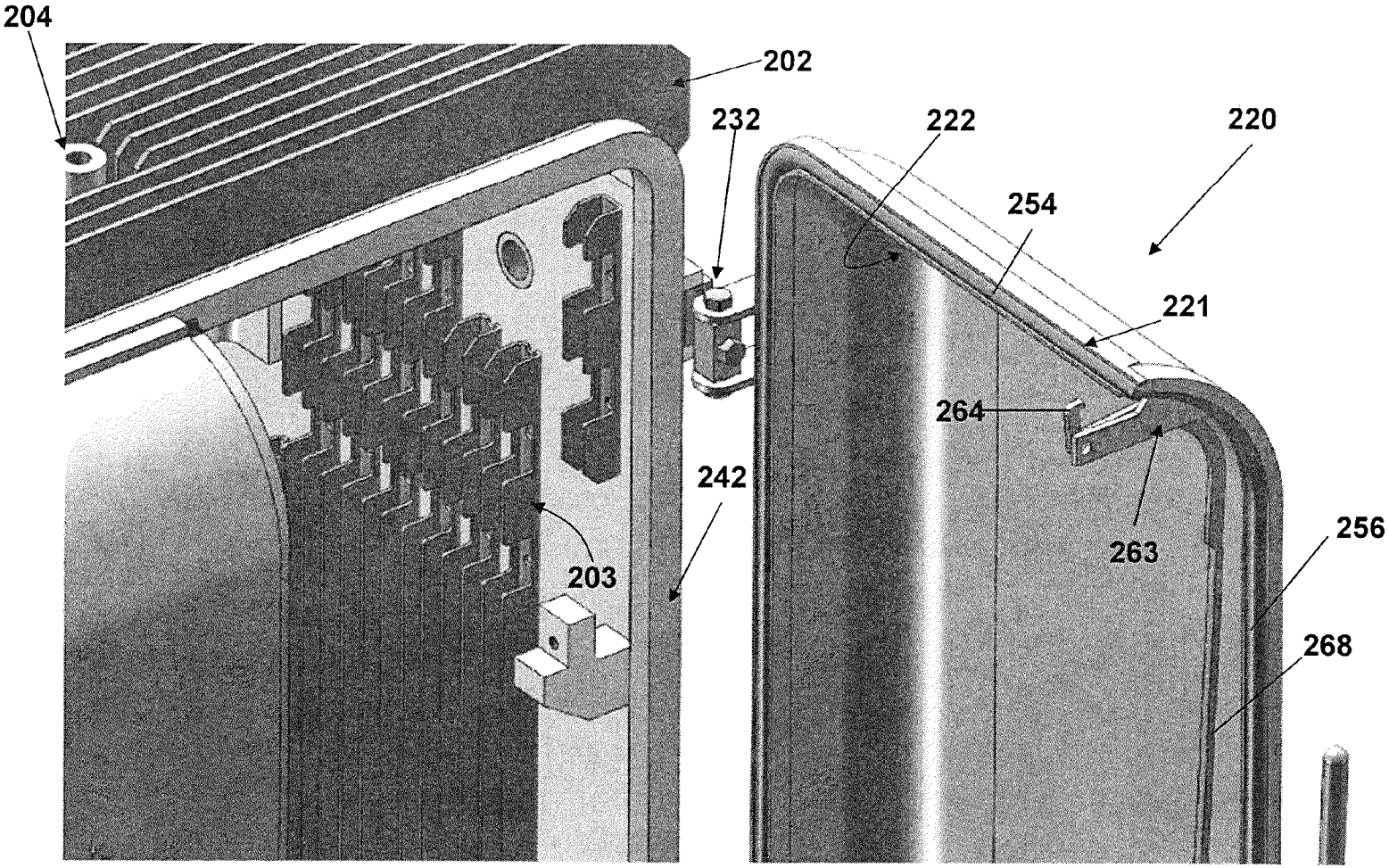
FIG. 18 is a detailed perspective view of a right door and gasket for the enclosure shown in FIG. 13.
Figure 19:
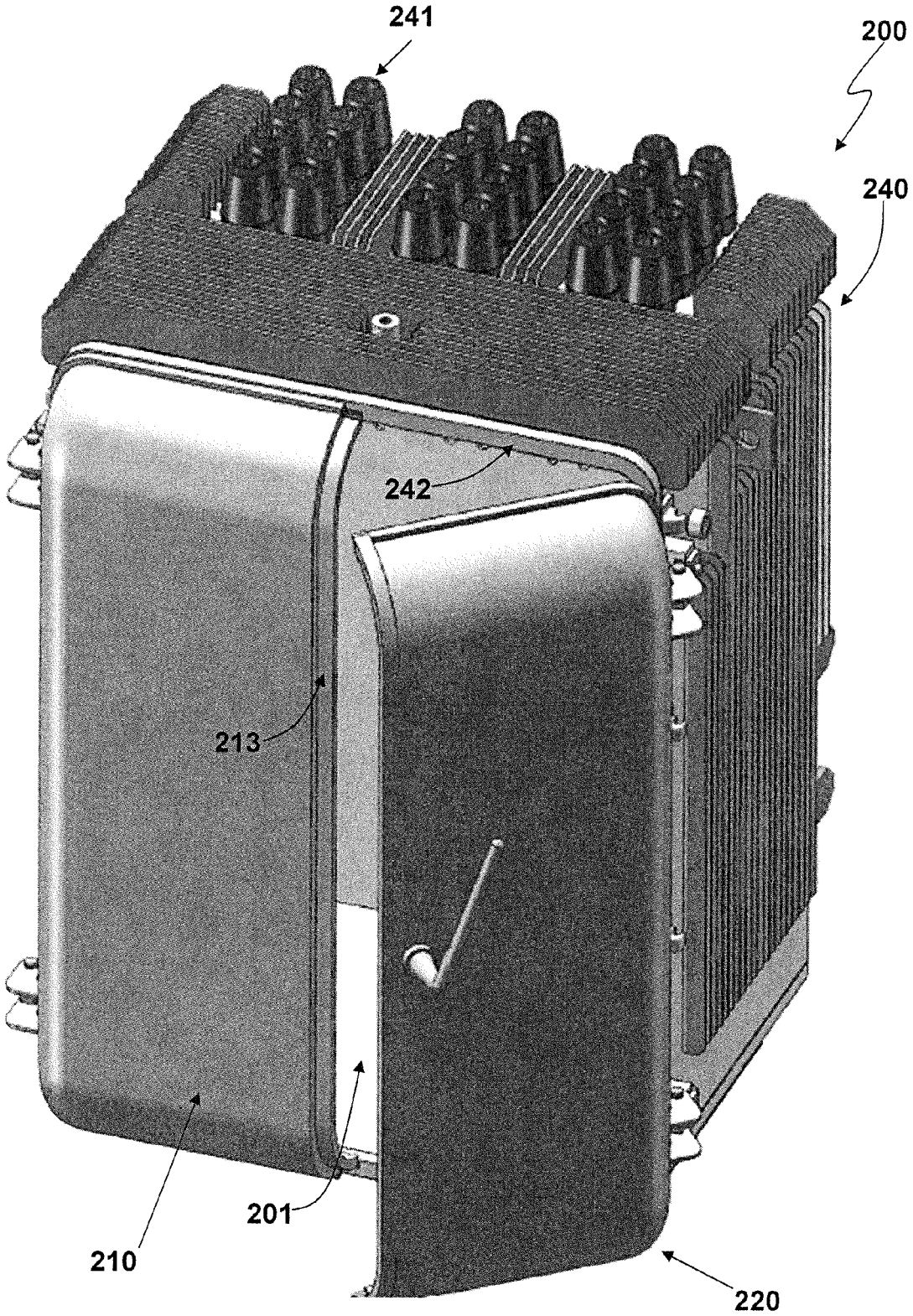
FIG. 19 is a perspective view illustrating closing the doors for the enclosure shown in FIG. 13.
Figure 20:
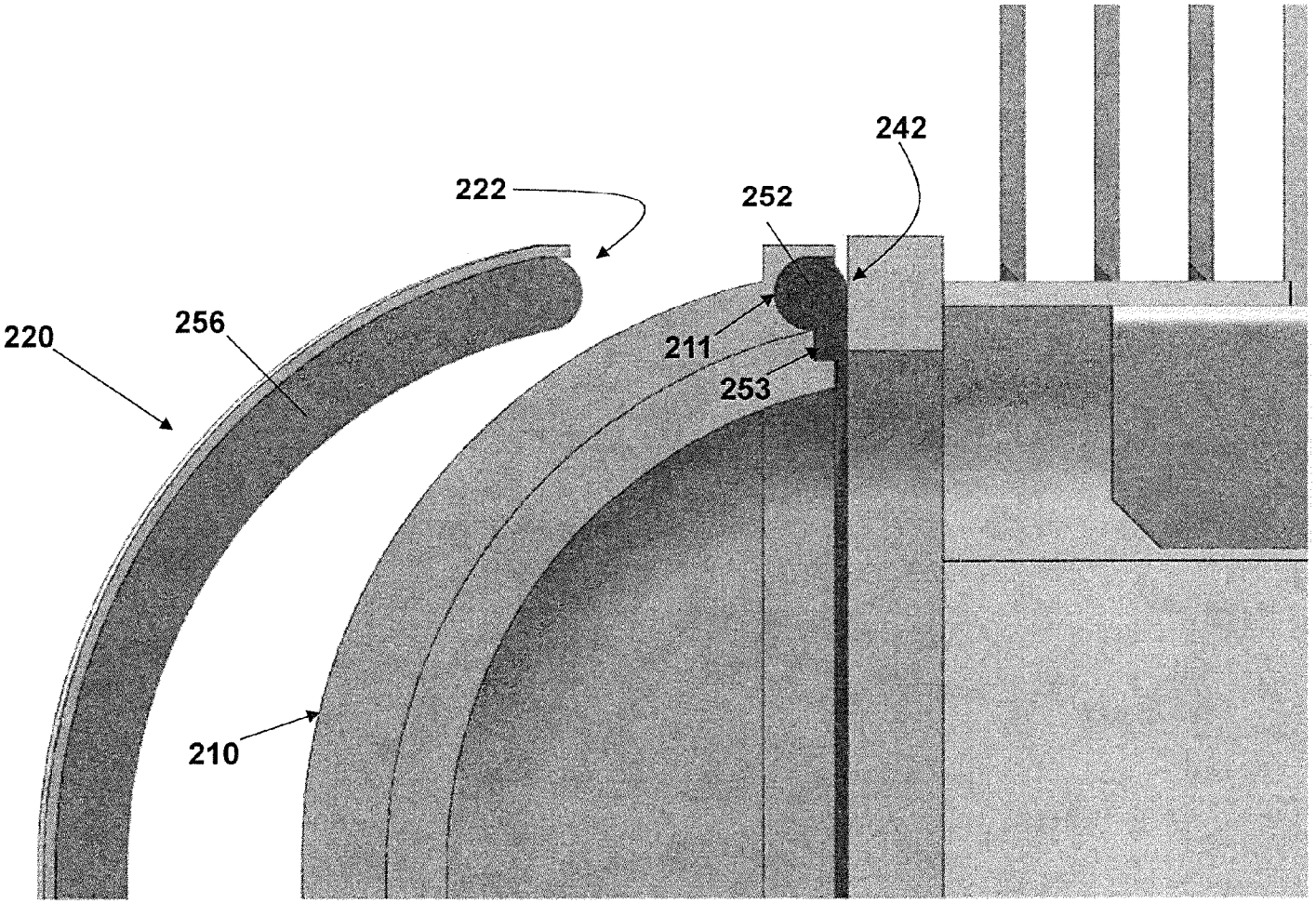
FIG. 20 is a cross-sectional view illustrating closing the doors for the enclosure shown in FIG. 13.
Figure 21:
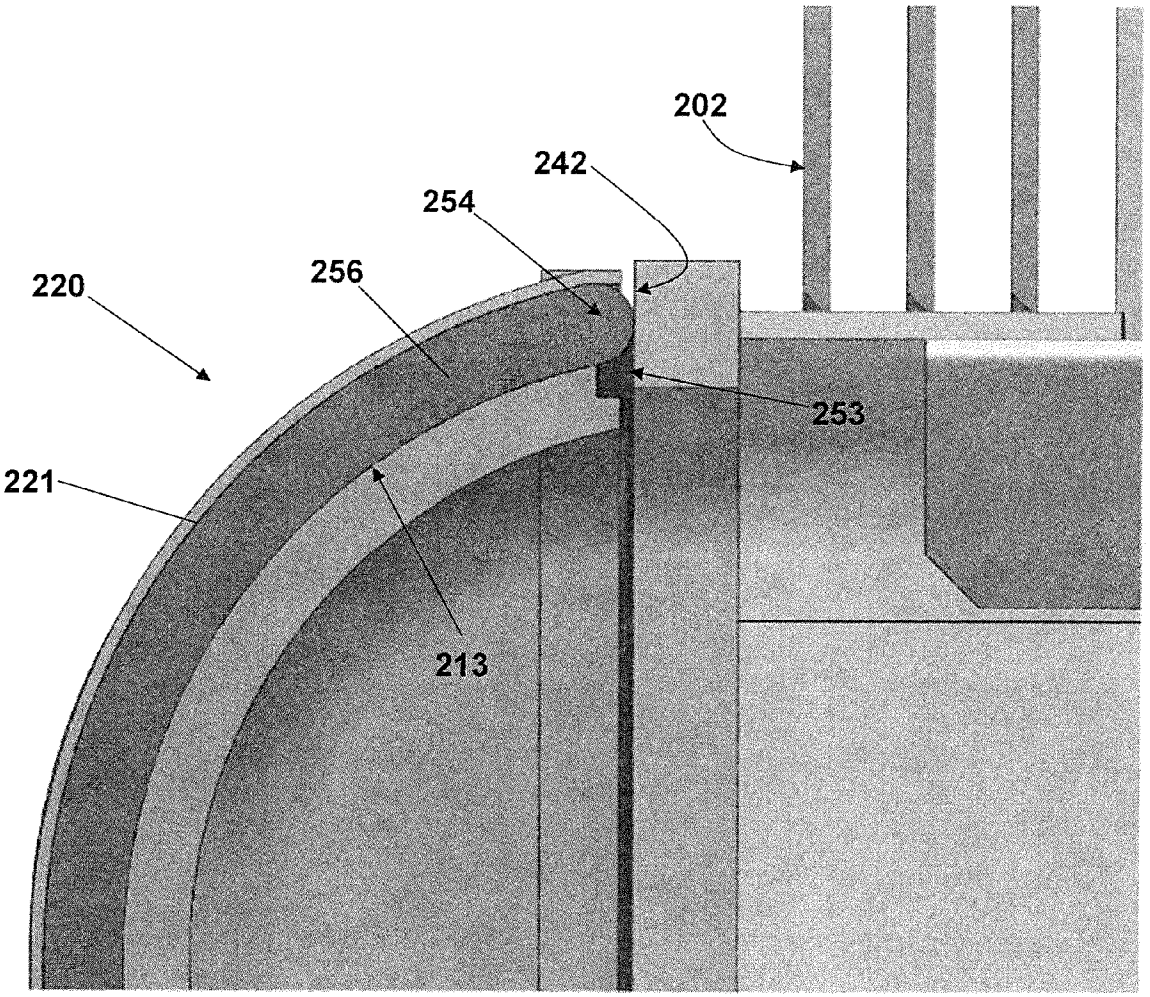
FIG. 21 is a cross-sectional view illustrating the doors in a closed state for the enclosure shown in FIG. 13.

As best illustrated in FIG. 18, second jamb gasket 254 of second door 220 extends in a continuous manner around the entire perimeter of second door 220, including a vertical section 256 that runs from the top of second door 220 to the bottom of second door 220. As further illustrated in FIGS. 19 and 20, first door 210 is first closed against cabinet body 240, so that first jamb gasket 252 and extension 253 seal against contact surface 242, thereby sealing both the main portion of first door 210 and lip 213. Then, as further illustrated in FIGS. 21 and 24, second door 220 is closed against both cabinet body 240 and lip 213 of first door 210. Second jamb gasket 254 seals against contact surface 242, ensuring a seal between second door 220 and cabinet body 240. Vertical portion 256 of second jamb gasket 254 seals along lip 213 of first door 210, thus ensuring a seal between doors 210, 220. Terminal ends of vertical portion 256 contact and seal against the conformal, concave surface of extension 253 of first jamb gasket 252, thus ensuring that lip 213 is properly sealed.

Figure 22:
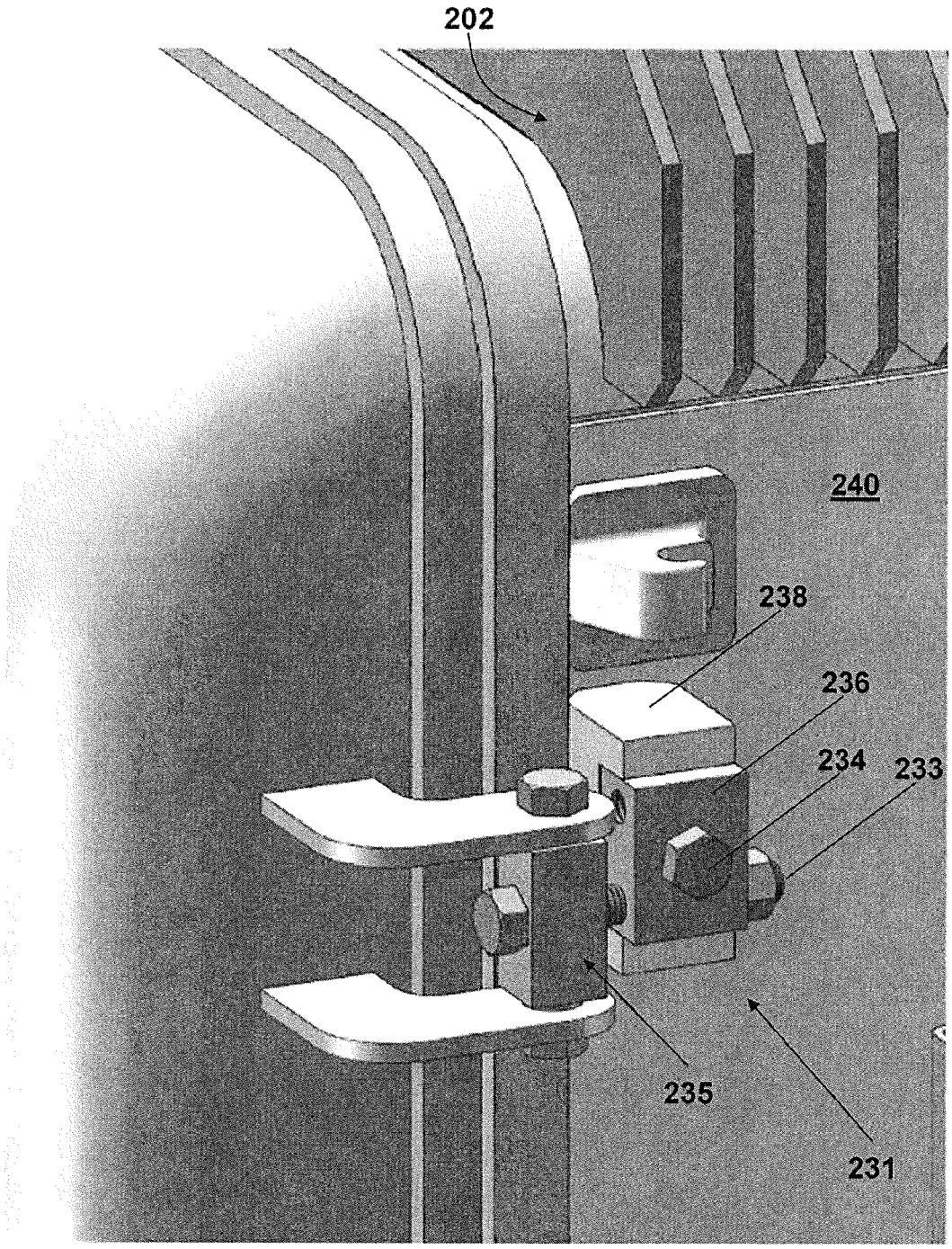
FIG. 22 is a detailed perspective view of a right door hinge for the enclosure shown in FIG. 13.
Figure 23:
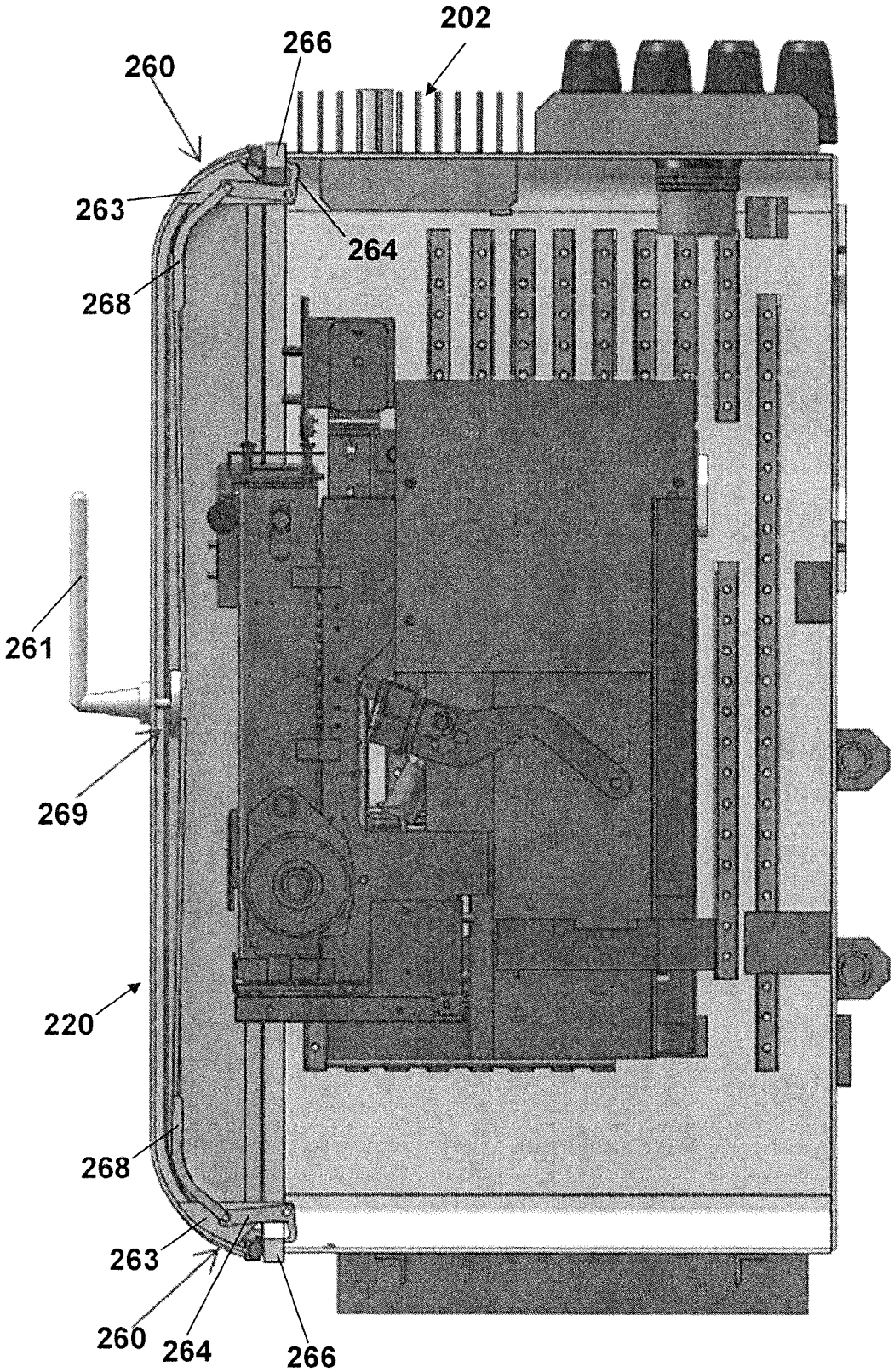
FIG. 23 is a right side X-ray view of the enclosure shown in FIG. 13.
Figure 24:
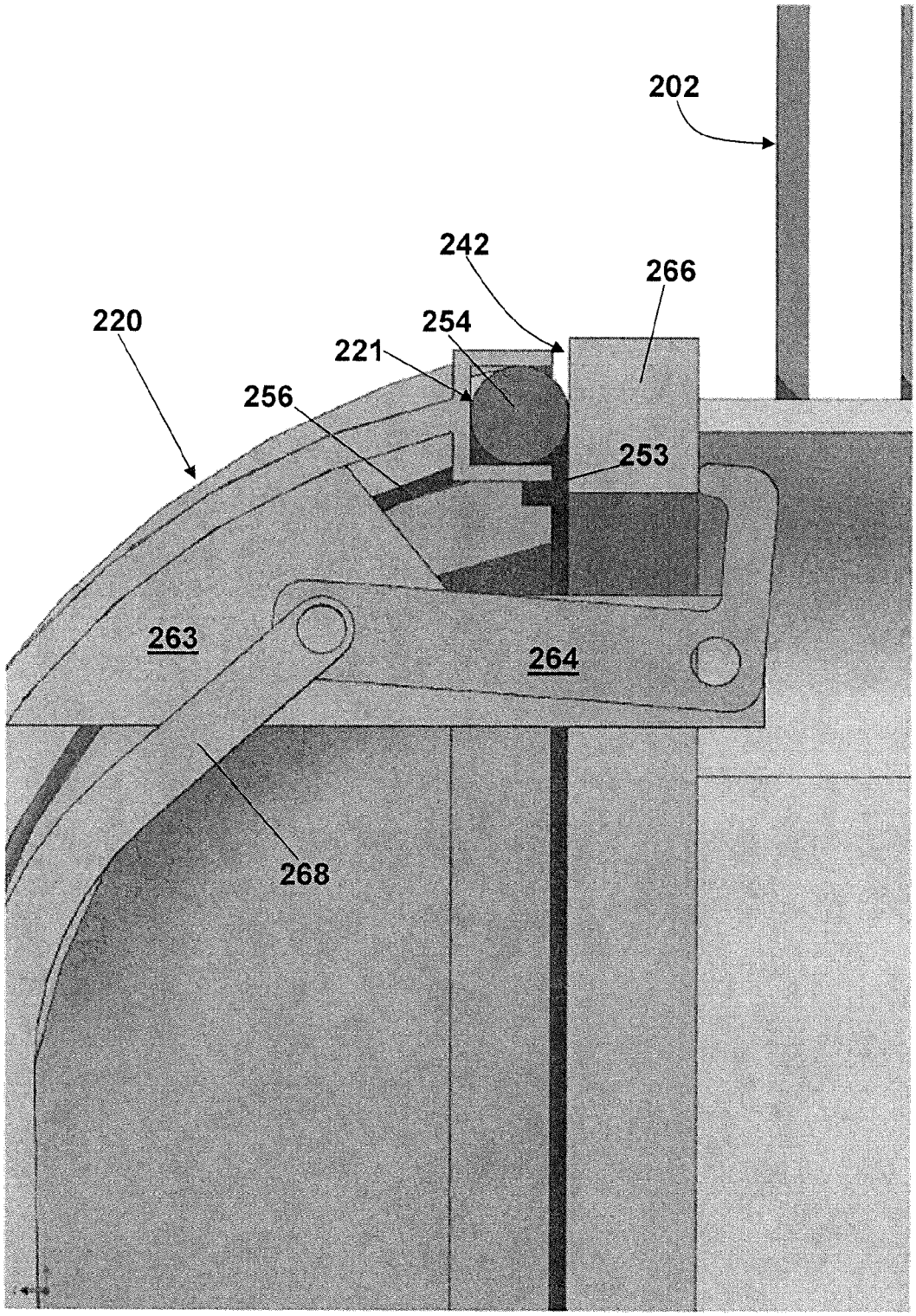
FIG. 24 is a detailed right side X-ray view illustrating a locking mechanism for the enclosure shown in FIG. 13.
Figure 25:
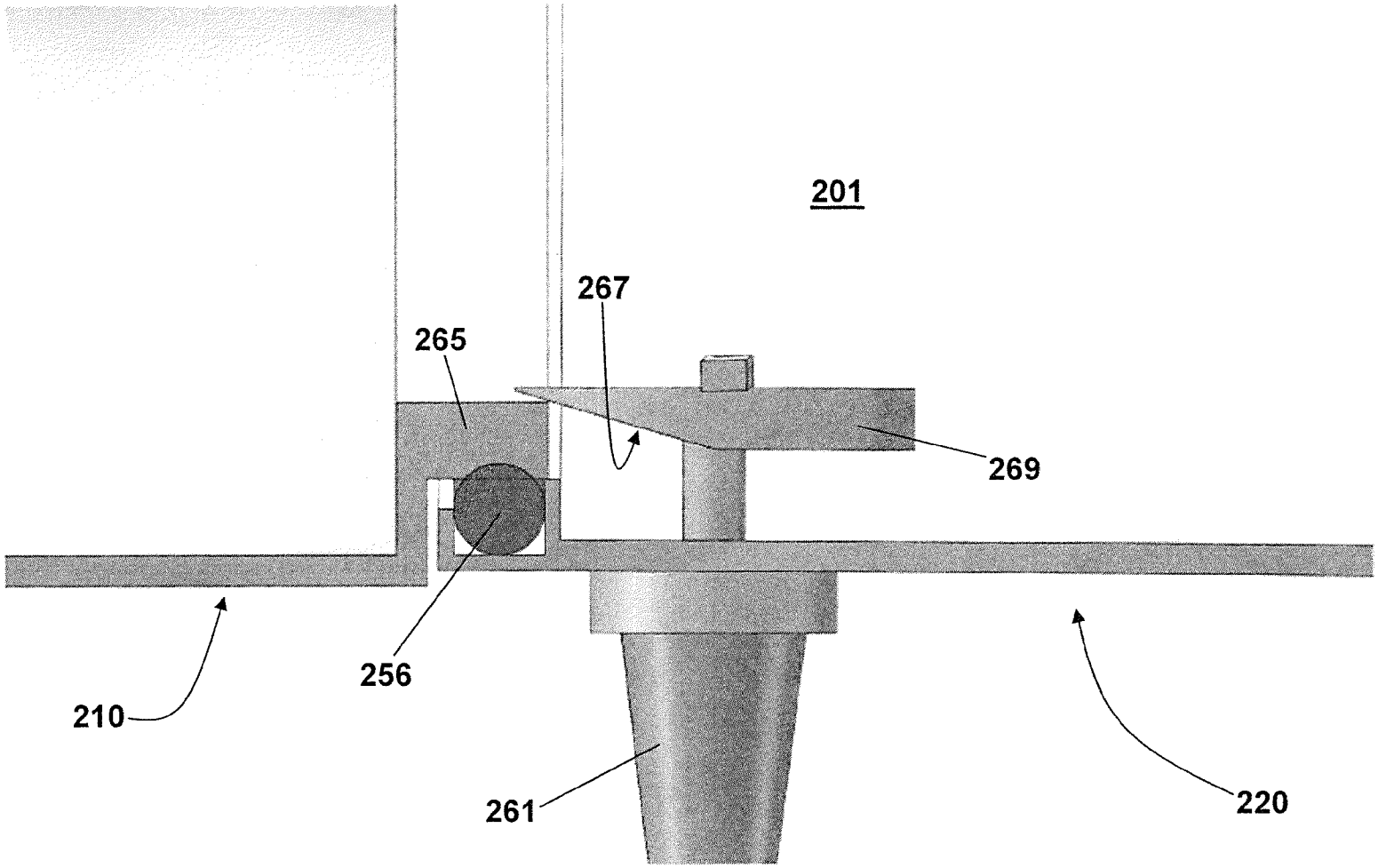
FIG. 25 is a detailed top X-ray view illustrating a locking cam for the enclosure shown in FIG. 13.

As illustrated in FIG. 22, each hinge 231, 232 may be adjustable so as to ensure that the respective door 210, 220 properly seals against both cabinet body 240 and the other door 220, 210. By way of example, hinges 231, 232 may include a first bolt 233 to adjust the longitudinal spacing between door 210, 220 and cabinet body 240—e.g., move door 210, 220 forward or backward with respect to cabinet body 240. Each hinge 231, 232 may further include a second bolt 234, perpendicular to first bolt 233, to adjust the lateral positioning of door 210, 220—e.g., move door 210, 220 left or right with respect to cabinet body 240.

First bolt 233 connects to a pivoting mechanism fixed to door 210, 220, and to an adjusting block 236 movably mounted within a frame 238 fixed to cabinet body 240. Rotation of first bolt 233 adjusts the distance between pivoting mechanism 235 and adjusting block 236, and thus adjusts the longitudinal spacing of door 210, 220.

Second bolt 234 connects to adjusting block 236 and frame 238. Rotation of second bolt 234 moves adjusting block in and out of frame 238, and thus adjusts the lateral positioning of door 210, 220.

As illustrated in FIGS. 18 and 23-25, a locking mechanism 260 is provided to lock and clamp doors 210, 220 into the closed position, thereby providing water-tight sealing of interior 201. Locking mechanism 260 includes a handle 261 on second door 220, which connects to a cam 269 on the interior side of second door 220. Rotation of handle 261 causes a corresponding rotation of cam 269. Coupling between cam 269 and handle 261 is designed to be water-tight, including gaskets and other suitable sealing mechanisms as required and known in the art to prevent ingress of water through handle 261.

Cam 269 is pivotably connected to linkages 268 extending to the top and bottom of second door 220. Ends of linkages 268 are pivotably connected to a respective end of clamp hooks 264 positioned at the top and bottom of second door 220. Rotation of cam 269 translates into a displacement of linkages 268 that pull up or push down on their respective ends of clamp hooks 264.

Clamp hooks 264 are each pivotably connected to a respective support surface 263 mounted on the interior surface of door 220 at top and bottom locations. As linkages 268 move up and down, causing corresponding pivoting of clamp hooks 264, clamp hooks 264 bear upon or move away from a respective bearing surface 266 fixed within cabinet body 240. When clamp hooks 264 bear upon bearing surfaces 266, second door 220 is pulled tightly against both jamb surface 242 and lip 213 of first door 210, thus locking both first door and second door 220 into the closed position.

To further ensure tight coupling between vertical portion 256 of second jamb gasket 254 and lip 213 of first door 210, cam 269 can be provided with a beveled surface 267 which, when rotated by handle 261, comes into contact with, and then bears upon, a corresponding engaging surface 265 on first door 210. As handle 261 rotates, increasing pressure is applied to engaging surface 265 via beveled surface 267, thus firmly locking first door 210 to second door 220 and pressuring lip 213 upon vertical portion 256 of second jamb gasket 254.

Figure 26:
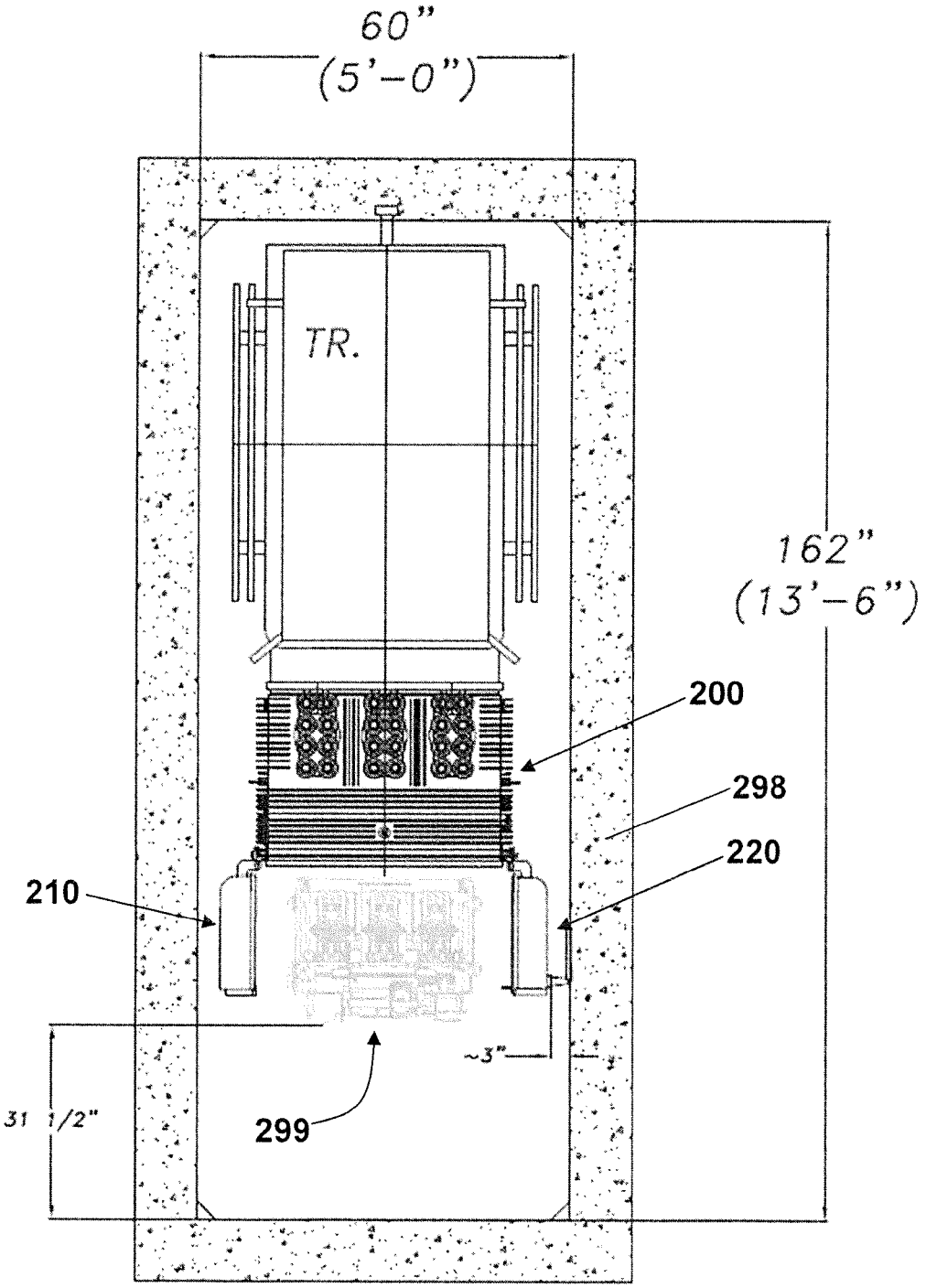
FIG. 26 is a top view of the enclosure shown in FIG. 13 within an underground enclosure.
Figure 27:
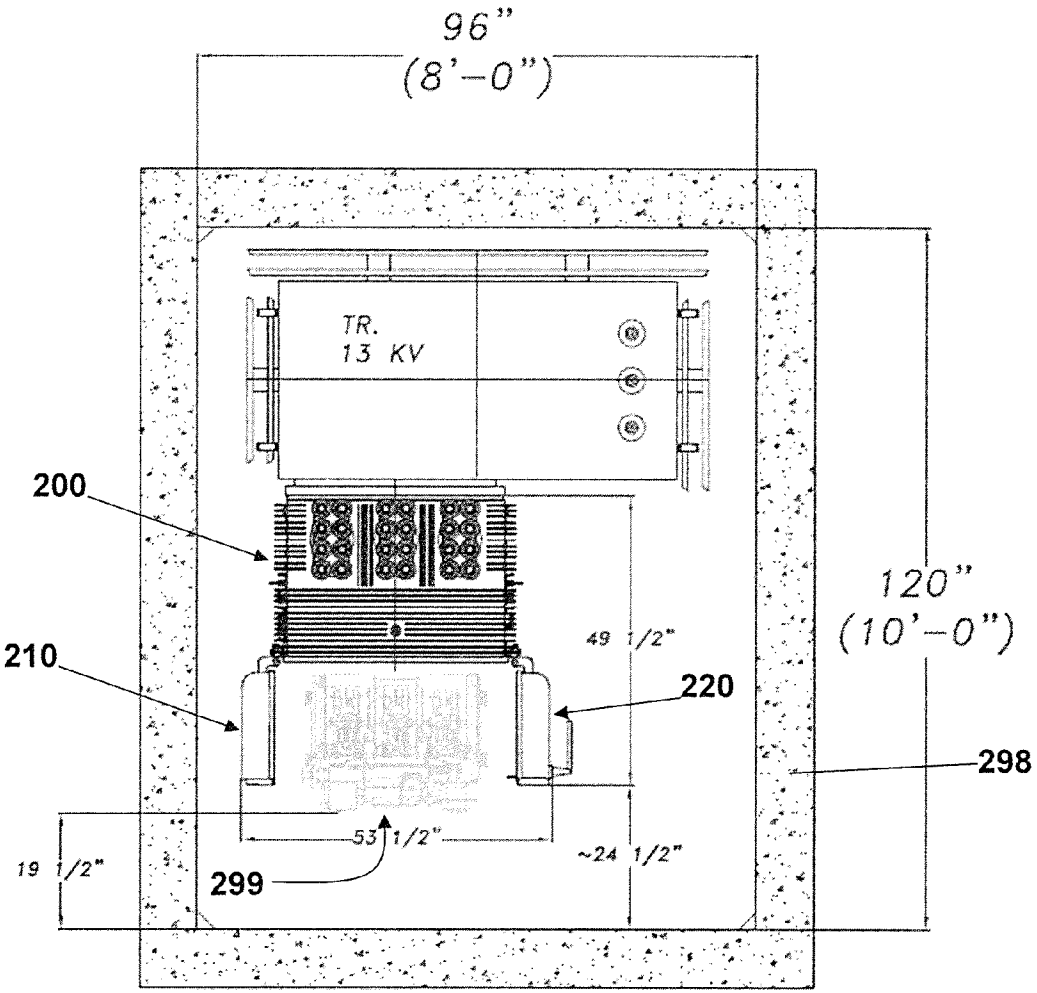
FIG. 27 is top view of the enclosure shown in FIG. 13 within another underground enclosure.
Figure 28:
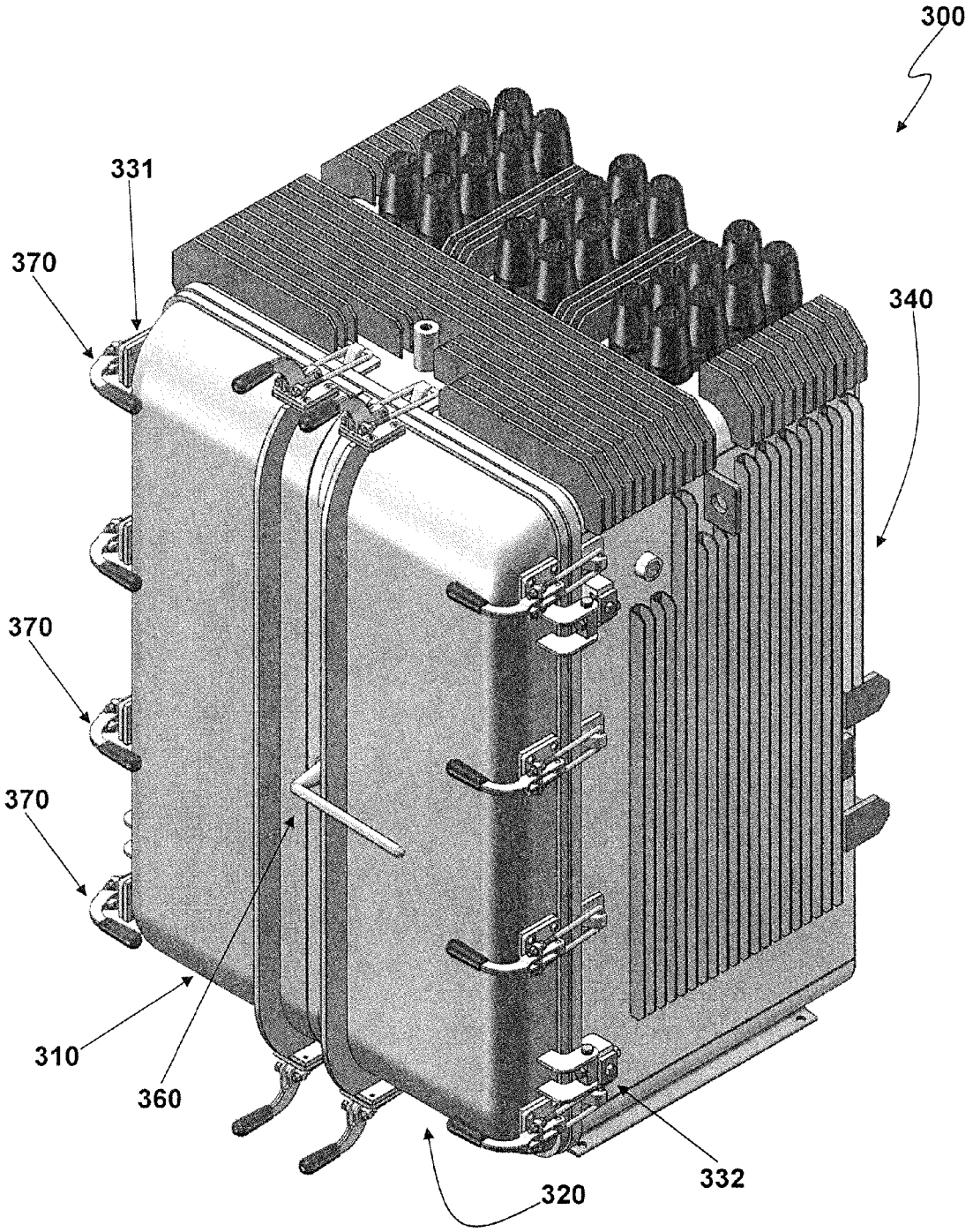
FIG. 28 is perspective view of a third embodiment enclosure.
Figure 29:
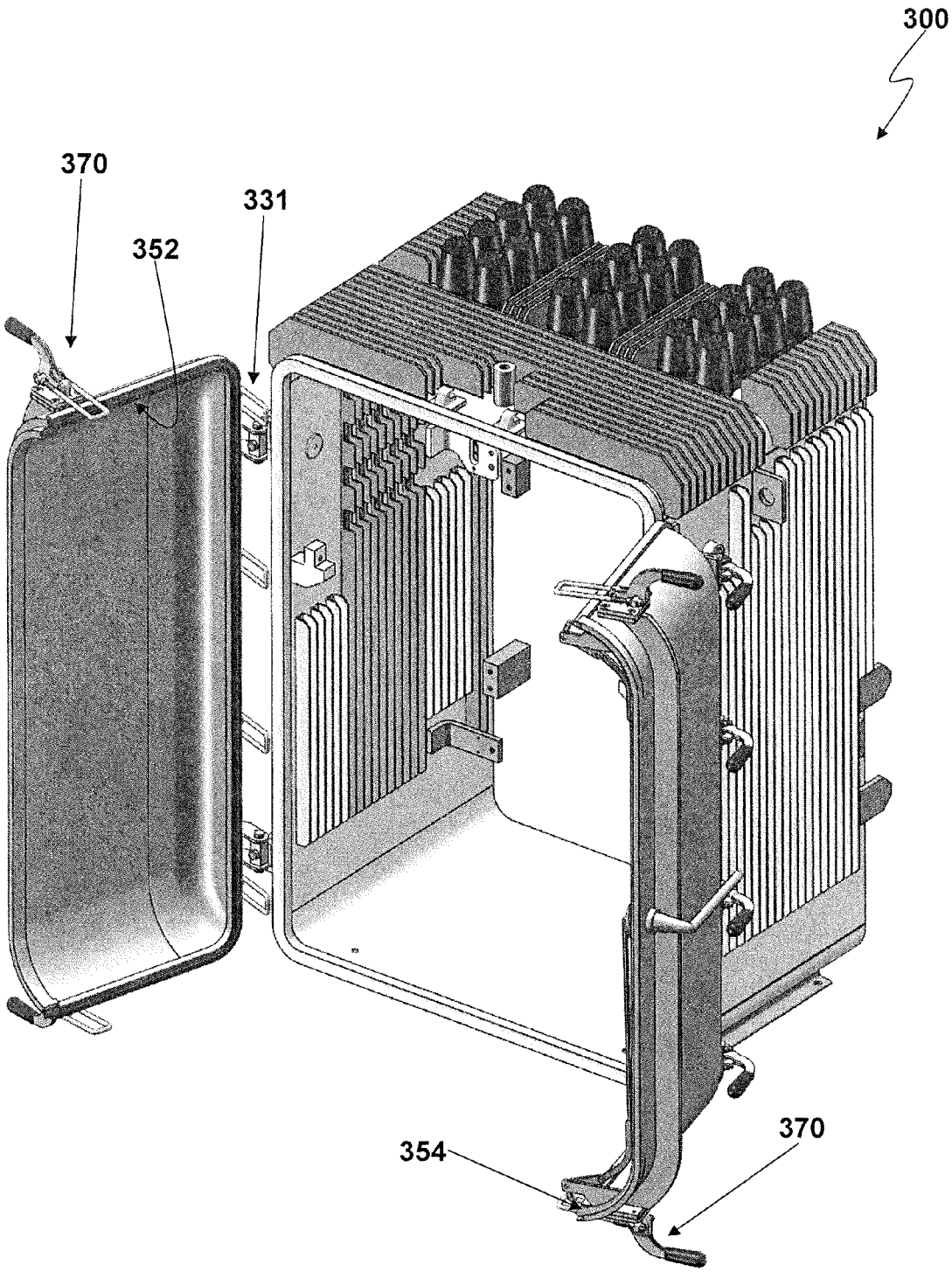
FIG. 29 is a perspective view of the enclosure shown in FIG. 28 with the access doors open.
Figure 30:
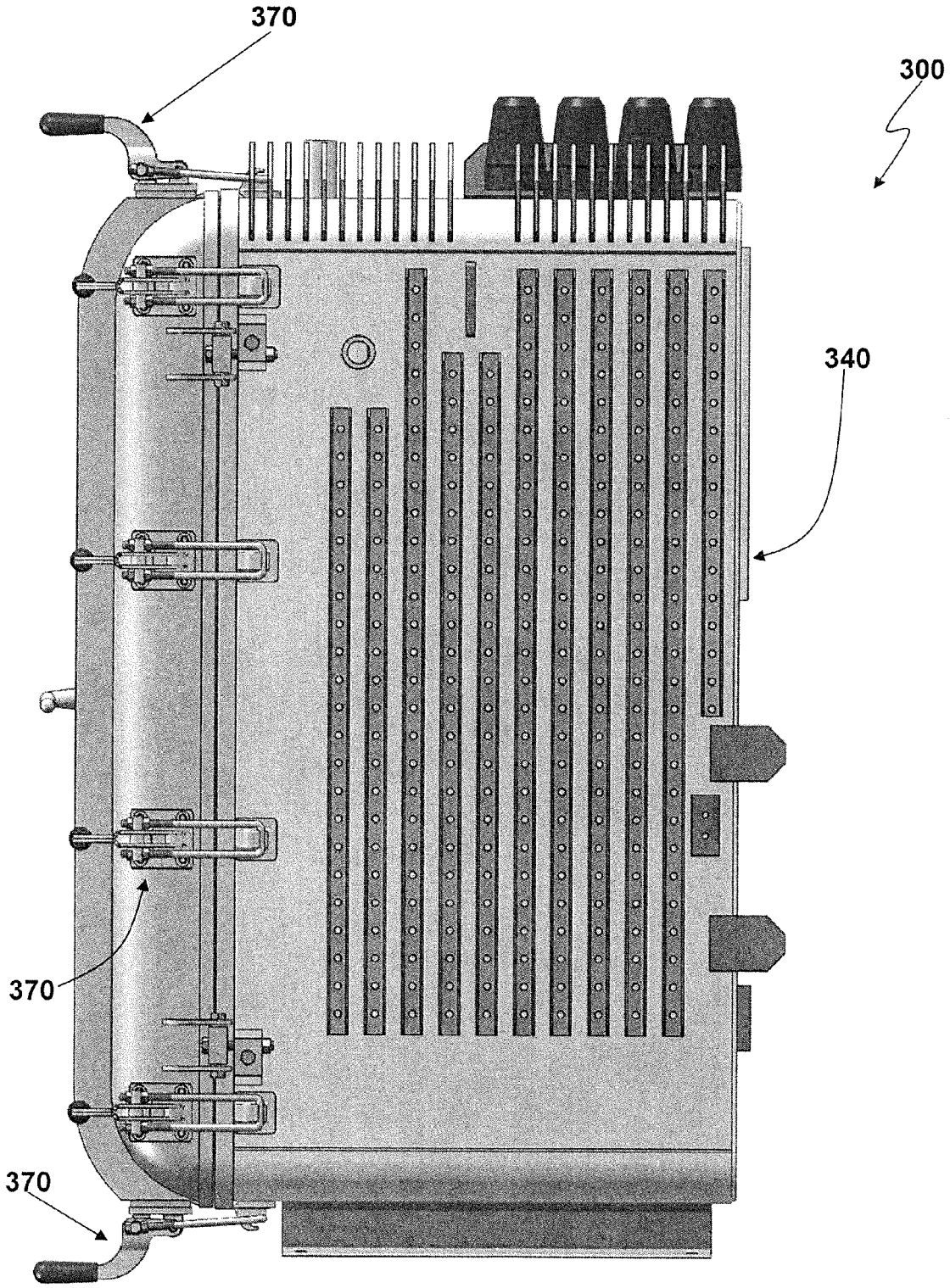
FIG. 30 is a right-side view of the enclosure shown in FIG. 28.
Figure 31:
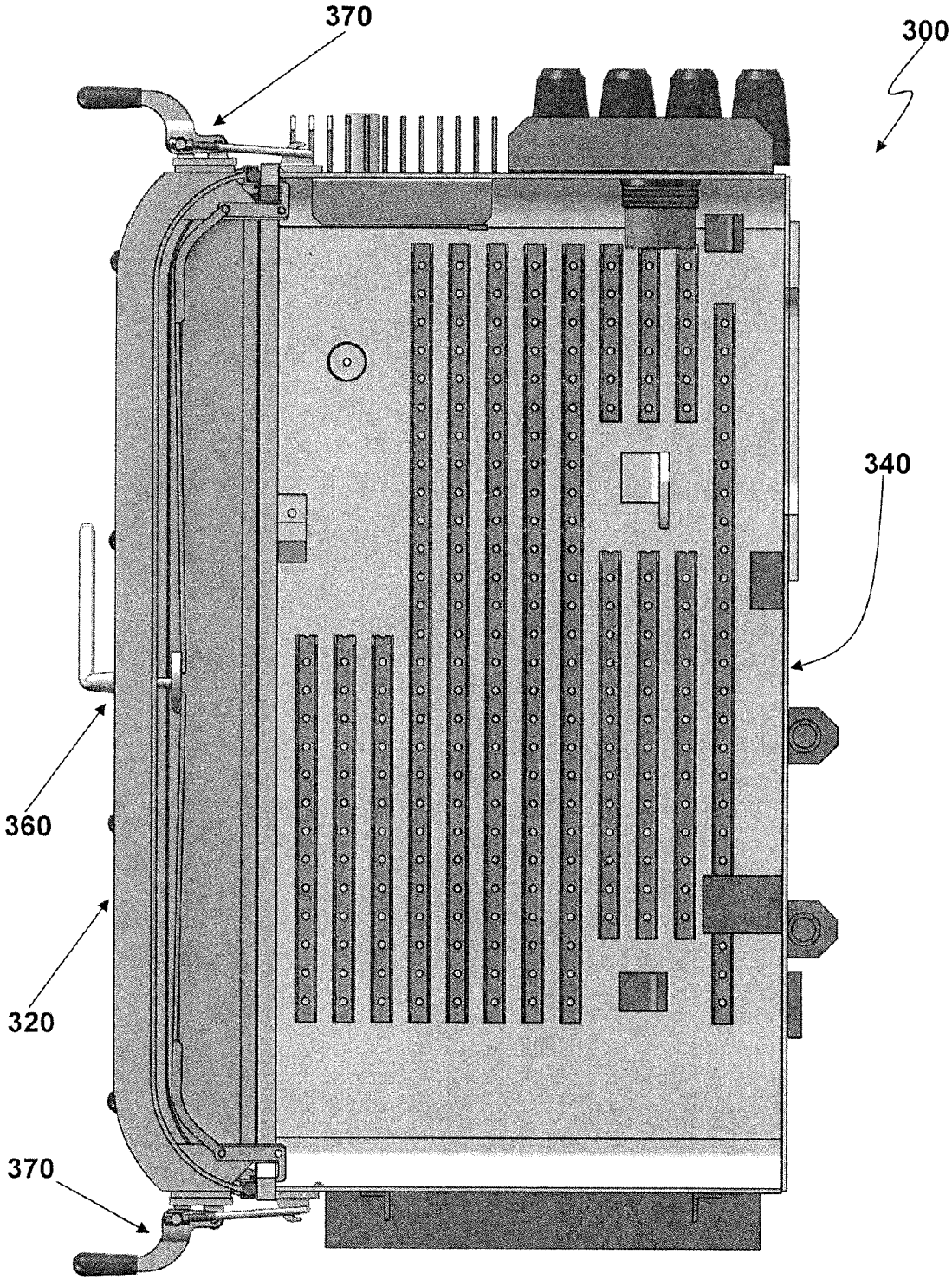
FIG. 31 is a right side X-ray view of the enclosure shown in FIG. 28.
Figure 32:
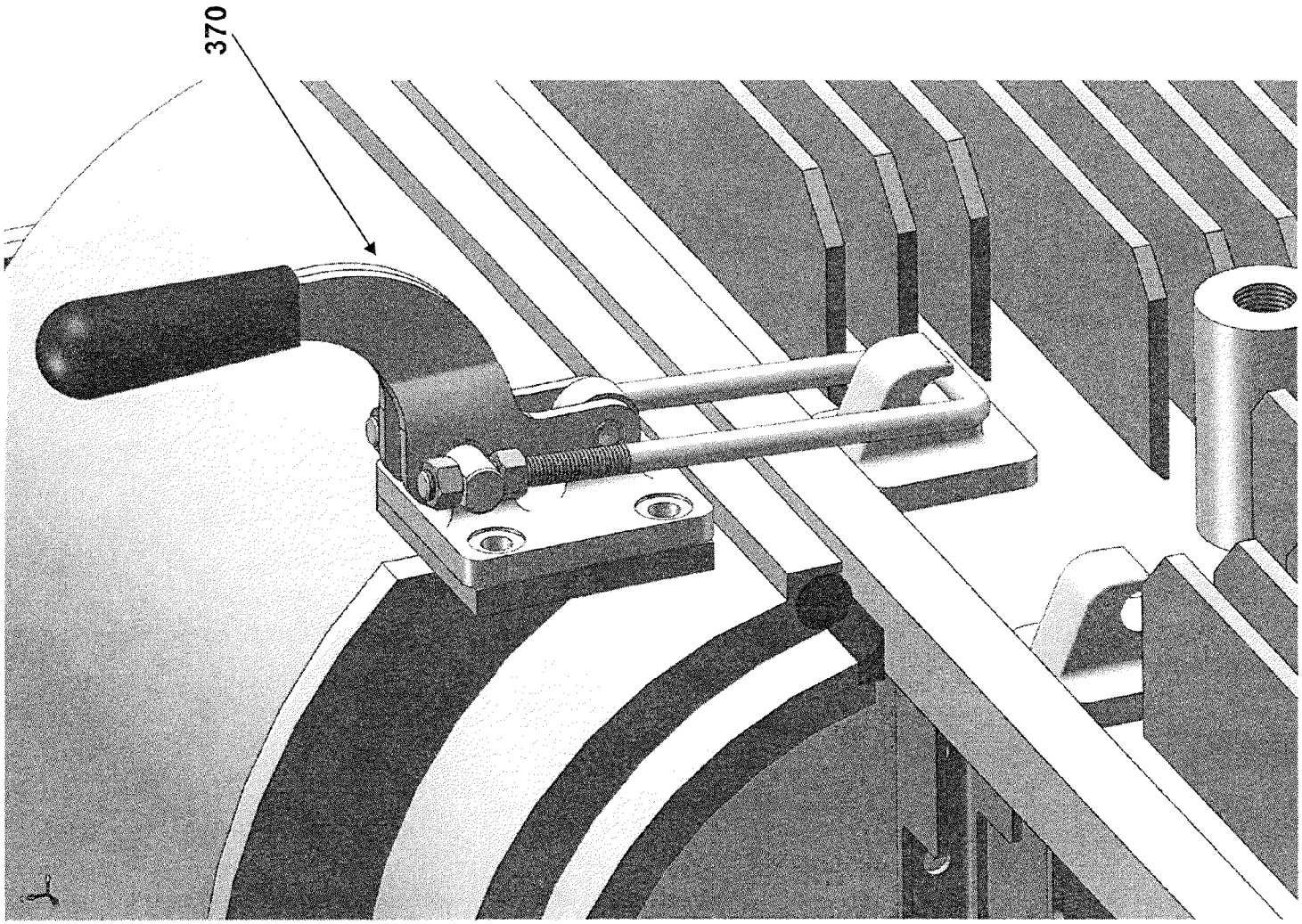
FIG. 32 is a detailed perspective view of a locking mechanism for the enclosure shown in FIG. 28.

As illustrated in FIGS. 26 and 27, in contrast to the single door enclosure 12 depicted in FIG. 1, the split-door arrangement of the embodiment enclosure 200 provides for significantly more space between doors 210, 220 and the wall of underground structures 298 when doors 210, 220 are opened.

A third embodiment submersible enclosure 300 is depicted in FIGS. 28-32. Doors 310, 320 (and related sealing gaskets 352, 354), hinges 331, 332 and cabinet body 340 are substantially similar to the corresponding doors 210, 220, hinges [231,232] *231, 232* and cabinet body 240 of the second embodiment enclosure 200 and thus are not discussed. Third embodiment enclosure preferably also includes a first locking mechanism 360 that is substantially identical to locking mechanism 260 of second embodiment enclosure 200.

However, regardless of whether or not enclosure 300 includes this first locking mechanism 360, enclosure 300 includes a second locking mechanism in the form of one or more [a] quick-release latching mechanisms 370 that are substantially identical to the a quick-release latching mechanisms 160 of the first embodiment enclosure 100. As shown illustrated in FIGS. 28-32, the quick-release latching mechanisms 370 are preferably disposed on top and bottom sides of doors 310, 320, to couple to cabinet body 340, as well as along the hinge-side of each door 310, 320. In particular, quick-release latching mechanisms 370 are preferably set immediately adjacent to each distal edge surface of each door 310, 320 at top and bottom sides of [door] *doors* 310, 320.

Those skilled in the art will recognize that the present invention has many applications, may be implemented in various manners and, as such is not to be limited by the foregoing embodiments and examples. Any number of the features of the different embodiments described herein may be combined into one single embodiment, the locations of particular elements can be altered and alternate embodiments having fewer than or more than all of the features herein described are possible. Functionality may also be, in whole or in part, distributed among multiple components, in manners now known or to become known.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention. While there have been shown and described fundamental features of the invention as applied to being exemplary embodiments thereof, it will be understood that omissions and substitutions and changes in the form and details of the disclosed invention may be made by those skilled in the art without departing from the spirit of the invention. Moreover, the scope of the present invention covers conventionally known, future developed variations and modifications to the components described herein as would be understood by those skilled in the art.

What is claimed is:

1. An enclosure for an electrical distribution system, the enclosure comprising:

a cabinet body defining an interior region configured to accept a component of the electrical distribution system, the cabinet body including at least *one opening configured to accept* an electrode sealed with and electrically isolated from the cabinet body and extending through the cabinet body to establish electrical connection between a corresponding terminal of the component and an electrical distribution network;

a first door pivotably connected to a side of the cabinet body, the first door comprising a contact surface configured to sealingly contact a corresponding surface on the cabinet body;

a second door pivotably connected to an opposing side of the cabinet body, the second door comprising a contact surface configured to sealingly contact a corresponding surface on the cabinet body;

a first *jamb* gasket [disposed along] *extending around three sides of the first door and terminating at* a distal edge surface of the first door; and a second *jamb* gasket *extending around the entire perimeter of the second door and including a vertical section* disposed along a distal edge surface of the second door;

wherein at least a portion of the first *jamb* gasket and the second *jamb* gasket have conformal shapes to sealingly mate with each other when the first and second doors are in a closed position, the first *jamb* gasket comprising a [recess extending along the first gasket] *concave surface on at least one end thereof* and the second *jamb* gasket [comprising a corresponding protrusion extending along the second gasket, the protrusion shaped to mate with the recess] *configured to contact and seal against the concave surface* when the first and second doors are in the closed position.

2. The enclosure of claim 1 wherein the first *jamb* gasket and the second *jamb* gasket are disposed within respective recesses [extending along the respective distal edge surfaces] *around the rim* of the first door and the second door.

[3. The enclosure of claim 1 further comprising at least a third gasket disposed between the contact surfaces of the first and second doors and the corresponding contact surfaces of the cabinet body.]

4. The enclosure of claim 1 further comprising a locking mechanism to lock the first and second doors in the closed position.

5. The enclosure of claim 4 wherein the locking mechanism comprises a plurality of quick-release latching mechanisms disposed between the first door and the cabinet body and disposed between the second door and the cabinet body.

[6. The enclosure of claim 4 wherein the locking mechanism comprises a handle disposed on the second door mechanically coupled to at least a clamp configured to engage a corresponding first surface fixed to the cabinet body when the handle is turned.]

[7. The enclosure of claim 6 wherein the handle is further coupled to a cam configured to engage a corresponding second surface fixed to the first door when the handle is turned.]

[8. The enclosure of claim 7 wherein the first door comprises a lip that is overlapped by the distal edge surface of the second door when in the closed position.]

[9. The enclosure of claim 8 wherein the second door comprises a gasket is further configured to sealingly engage with the lip when in the closed position.]

[10. The enclosure of claim 8 wherein the contact surface of the first door comprises:

a recess extending along the contact surface of the first door and terminating at the lip, the first gasket disposed in the recess and protruding above the recess, the first gasket comprising an extension extending from the recess to seal a contact surface of the lip with respect to a corresponding surface on the cabinet body when in the closed position;

wherein a top surface of the extension is concave and conformal to a corresponding protruding surface on the second gasket of the second door.]

[11. The enclosure of claim 10 wherein the second gasket extends around an entire perimeter of the second door.]

[12. The enclosure of claim 6 further comprising a plurality of quick-release latching mechanisms.]

13. The enclosure of claim 1 wherein an external surface of the cabinet body comprises a plurality of radiating fins.

14. The enclosure of claim 13 wherein an internal surface of the cabinet body comprises a plurality of fins thermally coupled to the radiating fins.

15. The enclosure of claim 1 wherein the component is a network protector.

16. The enclosure of claim 15 wherein the cabinet body includes *at least three openings configured to accept* at least three electrodes sealed with and electrically isolated from both the cabinet body and each other and extending through the cabinet body to establish electrical connections between corresponding terminals of the network protector and the electrical distribution network.

[17. The enclosure of claim 16 wherein when in the closed state the cabinet body and the first and second doors are configured to prevent ingress of water into the interior region for water depths up to twenty-five feet.]

* * * * *